(12) United States Patent
Sowards et al.

(10) Patent No.: US 12,433,567 B2
(45) Date of Patent: Oct. 7, 2025

(54) ULTRASOUND IMAGING SYSTEM

(71) Applicant: Bard Access Systems, Inc., Salt Lake City, UT (US)

(72) Inventors: Steffan Sowards, Salt Lake City, UT (US); William Robert McLaughlin, Bountiful, UT (US); Anthony K. Misener, Bountiful, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 127 days.

(21) Appl. No.: 18/121,802

(22) Filed: Mar. 15, 2023

(65) Prior Publication Data
US 2023/0293143 A1 Sep. 21, 2023

Related U.S. Application Data

(60) Provisional application No. 63/320,582, filed on Mar. 16, 2022.

(51) Int. Cl.
*A61B 8/00* (2006.01)
*A61B 8/08* (2006.01)

(52) U.S. Cl.
CPC ............ *A61B 8/085* (2013.01); *A61B 8/4254* (2013.01); *A61B 8/4427* (2013.01); *A61B 8/463* (2013.01); *A61B 8/5207* (2013.01)

(58) Field of Classification Search
CPC ..... A61B 8/085; A61B 8/4254; A61B 8/4427; A61B 8/463; A61B 8/5207; A61B 8/5223; A61B 8/0891; A61B 8/467; A61B 8/54
See application file for complete search history.

(56) References Cited

U.S. PATENT DOCUMENTS 3,697,917 A 10/1972 Orth et al.
5,148,809 A 9/1992 Biegeleisen-Knight et al.
(Continued)

FOREIGN PATENT DOCUMENTS

CN 102871645 A 1/2013
CN 105107067 B 5/2018
(Continued)

OTHER PUBLICATIONS

EP 20866520.8 filed Apr. 5, 2022 Extended European Search Report dated Aug. 22, 2023.
(Continued)

*Primary Examiner* — Michael J Carey
*Assistant Examiner* — Zainab Mohammed Aldarraji
(74) *Attorney, Agent, or Firm* — Rutan & Tucker LLP

(57) ABSTRACT

An ultrasound imaging system configured to capture a plurality of ultrasound images and determine one or more optimal ultrasound images from the plurality of ultrasound images. The ultrasound imaging system includes an ultrasound probe having an ultrasound array configured to capture a plurality of ultrasound images of a target vessel and other anatomical targets within a target area. The ultrasound imaging system further includes a console in communication with the ultrasound array, the console configured to detect one or more vessel characteristics of the target vessel, determine one or more vessel characteristic values from the one or more vessel characteristics, and compare each vessel characteristic value with one or more vessel characteristic thresholds to determine one or more optimal ultrasound images from the plurality of ultrasound images.

28 Claims, 6 Drawing Sheets

(56) References Cited

U.S. PATENT DOCUMENTS

| | | |
|---|---|---|
| 5,181,513 A | 1/1993 | Touboul et al. |
| 5,325,293 A | 6/1994 | Dorne |
| 5,349,865 A | 9/1994 | Kavli et al. |
| 5,441,052 A | 8/1995 | Miyajima |
| 5,549,554 A | 8/1996 | Miraki |
| 5,573,529 A | 11/1996 | Haak et al. |
| 5,758,650 A | 6/1998 | Miller et al. |
| 5,775,322 A | 7/1998 | Silverstein et al. |
| 5,879,297 A | 3/1999 | Haynor et al. |
| 5,897,503 A | 4/1999 | Lyon et al. |
| 5,908,387 A | 6/1999 | LeFree et al. |
| 5,967,984 A | 10/1999 | Chu et al. |
| 5,970,119 A | 10/1999 | Hofmann |
| 6,004,270 A | 12/1999 | Urbano et al. |
| 6,019,724 A | 2/2000 | Gronningsaeter et al. |
| 6,068,599 A | 5/2000 | Saito et al. |
| 6,074,367 A | 6/2000 | Hubbell |
| 6,129,668 A | 10/2000 | Haynor et al. |
| 6,132,379 A | 10/2000 | Patacsil et al. |
| 6,216,028 B1 | 4/2001 | Haynor et al. |
| 6,233,476 B1 | 5/2001 | Strommer et al. |
| 6,245,018 B1 | 6/2001 | Lee |
| 6,263,230 B1 | 7/2001 | Haynor et al. |
| 6,375,615 B1 | 4/2002 | Flaherty et al. |
| 6,436,043 B2 | 8/2002 | Bonnefous |
| 6,498,942 B1 | 12/2002 | Esenaliev et al. |
| 6,503,205 B2 | 1/2003 | Manor et al. |
| 6,508,769 B2 | 1/2003 | Bonnefous |
| 6,511,458 B2 | 1/2003 | Milo et al. |
| 6,524,249 B2 | 2/2003 | Moehring et al. |
| 6,543,642 B1 | 4/2003 | Milliorn |
| 6,554,771 B1 | 4/2003 | Buil et al. |
| 6,592,520 B1 | 7/2003 | Peszynski et al. |
| 6,592,565 B2 | 7/2003 | Twardowski |
| 6,601,705 B2 | 8/2003 | Molina et al. |
| 6,612,992 B1 | 9/2003 | Hossack et al. |
| 6,613,002 B1 | 9/2003 | Clark et al. |
| 6,623,431 B1 | 9/2003 | Sakuma et al. |
| 6,641,538 B2 | 11/2003 | Nakaya et al. |
| 6,647,135 B2 | 11/2003 | Bonnefous |
| 6,687,386 B1 | 2/2004 | Ito et al. |
| 6,733,458 B1 | 5/2004 | Steins et al. |
| 6,749,569 B1 | 6/2004 | Pellegretti |
| 6,754,608 B2 | 6/2004 | Svanerudh et al. |
| 6,755,789 B2 | 6/2004 | Stringer et al. |
| 6,840,379 B2 | 1/2005 | Franks-Farah et al. |
| 6,857,196 B2 | 2/2005 | Dalrymple |
| 6,979,294 B1 | 12/2005 | Selzer et al. |
| 7,074,187 B2 | 7/2006 | Selzer et al. |
| 7,244,234 B2 | 7/2007 | Ridley et al. |
| 7,359,554 B2 | 4/2008 | Klingensmith et al. |
| 7,534,209 B2 | 5/2009 | Abend et al. |
| 7,599,730 B2 | 10/2009 | Hunter et al. |
| 7,637,870 B2 | 12/2009 | Flaherty et al. |
| 7,681,579 B2 | 3/2010 | Schwartz |
| 7,691,061 B2 | 4/2010 | Hirota |
| 7,699,779 B2 | 4/2010 | Sasaki et al. |
| 7,720,520 B2 | 5/2010 | Willis |
| 7,727,153 B2 | 6/2010 | Fritz et al. |
| 7,734,326 B2 | 6/2010 | Pedain et al. |
| 7,831,449 B2 | 11/2010 | Ying et al. |
| 7,905,837 B2 | 3/2011 | Suzuki |
| 7,925,327 B2 | 4/2011 | Weese |
| 7,927,278 B2 | 4/2011 | Selzer et al. |
| 8,014,848 B2 | 9/2011 | Birkenbach et al. |
| 8,038,619 B2 | 10/2011 | Steinbacher |
| 8,060,181 B2 | 11/2011 | Rodriguez Ponce et al. |
| 8,075,488 B2 | 12/2011 | Burton |
| 8,090,427 B2 | 1/2012 | Eck et al. |
| 8,105,239 B2 | 1/2012 | Specht |
| 8,172,754 B2 | 5/2012 | Watanabe et al. |
| 8,175,368 B2 | 5/2012 | Sathyanarayana |
| 8,200,313 B1 | 6/2012 | Rambod et al. |
| 8,211,023 B2 | 7/2012 | Swan et al. |
| 8,228,347 B2 | 7/2012 | Beasley et al. |
| 8,298,147 B2 | 10/2012 | Huennekens et al. |
| 8,303,505 B2 | 11/2012 | Webler et al. |
| 8,323,202 B2 | 12/2012 | Roschak et al. |
| 8,328,727 B2 | 12/2012 | Miele et al. |
| 8,336,536 B1 | 12/2012 | Wood-Putnam et al. |
| 8,388,541 B2 | 3/2013 | Messerly et al. |
| 8,409,103 B2 | 4/2013 | Grunwald et al. |
| 8,449,465 B2 | 5/2013 | Nair et al. |
| 8,553,954 B2 | 10/2013 | Saikia |
| 8,556,815 B2 | 10/2013 | Pelissier et al. |
| 8,585,600 B2 | 11/2013 | Liu et al. |
| 8,622,913 B2 | 1/2014 | Dentinger et al. |
| 8,706,457 B2 | 4/2014 | Hart et al. |
| 8,727,988 B2 | 5/2014 | Flaherty et al. |
| 8,734,357 B2 | 5/2014 | Taylor |
| 8,744,211 B2 | 6/2014 | Owen |
| 8,754,865 B2 | 6/2014 | Merritt et al. |
| 8,764,663 B2 | 7/2014 | Smok et al. |
| 8,781,194 B2 | 7/2014 | Malek et al. |
| 8,781,555 B2 | 7/2014 | Burnside et al. |
| 8,790,263 B2 | 7/2014 | Randall et al. |
| 8,849,382 B2 | 9/2014 | Cox et al. |
| 8,939,908 B2 | 1/2015 | Suzuki et al. |
| 8,961,420 B2 | 2/2015 | Zhang |
| 9,022,940 B2 | 5/2015 | Meier |
| 9,087,147 B1 * | 7/2015 | Fonte ............... A61B 5/0263 |
| 9,138,290 B2 | 9/2015 | Hadjicostis |
| 9,199,082 B1 | 12/2015 | Yared et al. |
| 9,204,858 B2 | 12/2015 | Pelissier et al. |
| 9,220,477 B2 | 12/2015 | Urabe et al. |
| 9,295,447 B2 | 3/2016 | Shah |
| 9,320,493 B2 | 4/2016 | Visveshwara |
| 9,357,980 B2 | 6/2016 | Toji et al. |
| 9,364,171 B2 | 6/2016 | Harris et al. |
| 9,427,207 B2 | 8/2016 | Sheldon et al. |
| 9,445,780 B2 | 9/2016 | Hossack et al. |
| 9,456,766 B2 | 10/2016 | Cox et al. |
| 9,456,804 B2 | 10/2016 | Tamada |
| 9,468,413 B2 | 10/2016 | Hall et al. |
| 9,492,097 B2 | 11/2016 | Wilkes et al. |
| 9,521,961 B2 | 12/2016 | Silverstein et al. |
| 9,554,716 B2 | 1/2017 | Burnside et al. |
| 9,582,876 B2 | 2/2017 | Specht |
| 9,610,061 B2 | 4/2017 | Ebbini et al. |
| 9,636,031 B2 | 5/2017 | Cox |
| 9,649,037 B2 | 5/2017 | Lowe et al. |
| 9,649,048 B2 | 5/2017 | Cox et al. |
| 9,702,969 B2 | 7/2017 | Hope Simpson et al. |
| 9,715,757 B2 | 7/2017 | Ng et al. |
| 9,717,415 B2 * | 8/2017 | Cohen ............... G06T 7/0014 |
| 9,731,066 B2 | 8/2017 | Liu et al. |
| 9,814,433 B2 | 11/2017 | Benishti et al. |
| 9,814,531 B2 | 11/2017 | Yagi et al. |
| 9,861,337 B2 | 1/2018 | Patwardhan et al. |
| 9,895,138 B2 | 2/2018 | Sasaki |
| 9,913,605 B2 | 3/2018 | Harris et al. |
| 9,949,720 B2 | 4/2018 | Southard et al. |
| 10,043,272 B2 | 8/2018 | Forzoni et al. |
| 10,449,330 B2 | 10/2019 | Newman et al. |
| 10,524,691 B2 | 1/2020 | Newman et al. |
| 10,751,509 B2 | 8/2020 | Misener |
| 11,564,861 B1 | 1/2023 | Gaines |
| 11,900,593 B2 * | 2/2024 | Dhatt ............... A61B 8/5223 |
| 2002/0038088 A1 | 3/2002 | Imran et al. |
| 2003/0047126 A1 | 3/2003 | Tomaschko |
| 2003/0106825 A1 | 6/2003 | Molina et al. |
| 2003/0109910 A1 | 6/2003 | Lachenbruch et al. |
| 2003/0120154 A1 | 6/2003 | Sauer et al. |
| 2003/0125629 A1 | 7/2003 | Ustuner |
| 2003/0135115 A1 | 7/2003 | Burdette et al. |
| 2003/0149366 A1 | 8/2003 | Stringer et al. |
| 2003/0167030 A1 | 9/2003 | Weitzel et al. |
| 2003/0216648 A1 | 11/2003 | Lizzi et al. |
| 2004/0015080 A1 | 1/2004 | Kelly et al. |
| 2004/0055925 A1 | 3/2004 | Franks-Farah et al. |
| 2004/0197267 A1 | 10/2004 | Black et al. |
| 2005/0000975 A1 | 1/2005 | Carco et al. |
| 2005/0049504 A1 | 3/2005 | Lo et al. |
| 2005/0075597 A1 | 4/2005 | Vournakis et al. |

(56) References Cited

U.S. PATENT DOCUMENTS

| | | |
|---|---|---|
| 2005/0165299 A1 | 7/2005 | Kressy et al. |
| 2005/0251030 A1 | 11/2005 | Azar et al. |
| 2005/0267365 A1 | 12/2005 | Sokulin et al. |
| 2006/0004290 A1 | 1/2006 | Smith et al. |
| 2006/0013523 A1 | 1/2006 | Childers et al. |
| 2006/0015039 A1 | 1/2006 | Cassidy et al. |
| 2006/0020204 A1 | 1/2006 | Serra et al. |
| 2006/0047617 A1 | 3/2006 | Bacioiu et al. |
| 2006/0079781 A1 | 4/2006 | Germond-Rouet et al. |
| 2006/0184029 A1 | 8/2006 | Haim et al. |
| 2006/0210130 A1 | 9/2006 | Germond-Rouet et al. |
| 2006/0241463 A1 | 10/2006 | Shau et al. |
| 2007/0043341 A1 | 2/2007 | Anderson et al. |
| 2007/0049822 A1 | 3/2007 | Bunce et al. |
| 2007/0073155 A1 | 3/2007 | Park et al. |
| 2007/0167738 A1 | 7/2007 | Timinger et al. |
| 2007/0199848 A1 | 8/2007 | Ellswood et al. |
| 2007/0239005 A1 | 10/2007 | Ogasawara |
| 2007/0239120 A1 | 10/2007 | Brock et al. |
| 2007/0249911 A1 | 10/2007 | Simon |
| 2007/0287886 A1 | 12/2007 | Saadat |
| 2008/0021322 A1 | 1/2008 | Stone et al. |
| 2008/0033293 A1 | 2/2008 | Beasley et al. |
| 2008/0033759 A1 | 2/2008 | Finlay |
| 2008/0051657 A1 | 2/2008 | Rold |
| 2008/0108930 A1 | 5/2008 | Weitzel et al. |
| 2008/0125651 A1 | 5/2008 | Watanabe et al. |
| 2008/0146915 A1 | 6/2008 | McMorrow |
| 2008/0177186 A1 | 7/2008 | Slater et al. |
| 2008/0221425 A1 | 9/2008 | Olson et al. |
| 2008/0269605 A1 | 10/2008 | Nakaya |
| 2008/0294037 A1 | 11/2008 | Richter |
| 2008/0300491 A1 | 12/2008 | Bonde et al. |
| 2009/0012399 A1 | 1/2009 | Sunagawa et al. |
| 2009/0012401 A1 | 1/2009 | Steinbacher |
| 2009/0074280 A1 | 3/2009 | Lu et al. |
| 2009/0105594 A1 | 4/2009 | Reynolds et al. |
| 2009/0118612 A1 | 5/2009 | Grunwald et al. |
| 2009/0124903 A1 | 5/2009 | Osaka |
| 2009/0137887 A1 | 5/2009 | Shariati et al. |
| 2009/0137907 A1 | 5/2009 | Takimoto et al. |
| 2009/0143672 A1 | 6/2009 | Harms et al. |
| 2009/0143684 A1 | 6/2009 | Cermak et al. |
| 2009/0156926 A1 | 6/2009 | Messerly et al. |
| 2009/0281413 A1 | 11/2009 | Boyden et al. |
| 2009/0306509 A1 | 12/2009 | Pedersen et al. |
| 2010/0010348 A1 | 1/2010 | Halmann |
| 2010/0168576 A1 | 7/2010 | Poland et al. |
| 2010/0211026 A2 | 8/2010 | Sheetz et al. |
| 2010/0249598 A1 | 9/2010 | Smith et al. |
| 2010/0286515 A1 | 11/2010 | Gravenstein et al. |
| 2010/0312121 A1 | 12/2010 | Guan |
| 2010/0324423 A1 | 12/2010 | El-Aklouk et al. |
| 2011/0002518 A1 | 1/2011 | Ziv-Ari et al. |
| 2011/0026796 A1 | 2/2011 | Hyun et al. |
| 2011/0071404 A1 | 3/2011 | Schmitt et al. |
| 2011/0074244 A1 | 3/2011 | Osawa |
| 2011/0087107 A1 | 4/2011 | Lindekugel et al. |
| 2011/0166451 A1 | 7/2011 | Blaivas et al. |
| 2011/0282188 A1 | 11/2011 | Burnside et al. |
| 2011/0295108 A1 | 12/2011 | Cox et al. |
| 2011/0313293 A1 | 12/2011 | Lindekugel et al. |
| 2012/0136242 A1 | 5/2012 | Qi et al. |
| 2012/0136256 A1 | 5/2012 | Nozaki et al. |
| 2012/0143029 A1 | 6/2012 | Silverstein et al. |
| 2012/0165679 A1 | 6/2012 | Orome et al. |
| 2012/0179038 A1 | 7/2012 | Meurer et al. |
| 2012/0179042 A1 | 7/2012 | Fukumoto et al. |
| 2012/0179044 A1 | 7/2012 | Chiang et al. |
| 2012/0197132 A1 | 8/2012 | O'Connor |
| 2012/0220865 A1 | 8/2012 | Brown et al. |
| 2012/0277576 A1 | 11/2012 | Lui |
| 2013/0041250 A1 | 2/2013 | Pelissier et al. |
| 2013/0102889 A1 | 4/2013 | Southard et al. |
| 2013/0131499 A1 | 5/2013 | Chan et al. |
| 2013/0131502 A1 | 5/2013 | Blaivas et al. |
| 2013/0144166 A1 | 6/2013 | Specht et al. |
| 2013/0150724 A1 | 6/2013 | Blaivas et al. |
| 2013/0188832 A1 | 7/2013 | Ma et al. |
| 2013/0197367 A1 | 8/2013 | Smok et al. |
| 2013/0218024 A1 | 8/2013 | Boctor et al. |
| 2013/0323700 A1 | 12/2013 | Samosky et al. |
| 2013/0338503 A1 | 12/2013 | Cohen et al. |
| 2013/0338508 A1 | 12/2013 | Nakamura et al. |
| 2013/0345566 A1 | 12/2013 | Weitzel et al. |
| 2014/0005530 A1 | 1/2014 | Liu et al. |
| 2014/0031694 A1 | 1/2014 | Solek |
| 2014/0066779 A1 | 3/2014 | Nakanishi |
| 2014/0073976 A1 | 3/2014 | Fonte et al. |
| 2014/0100440 A1 | 4/2014 | Cheline et al. |
| 2014/0114194 A1 | 4/2014 | Kanayama et al. |
| 2014/0170620 A1 | 6/2014 | Savitsky et al. |
| 2014/0180098 A1 | 6/2014 | Flaherty et al. |
| 2014/0180116 A1 | 6/2014 | Lindekugel et al. |
| 2014/0188133 A1 | 7/2014 | Misener |
| 2014/0188440 A1 | 7/2014 | Donhowe et al. |
| 2014/0276048 A1 | 9/2014 | Kiley et al. |
| 2014/0276059 A1 | 9/2014 | Sheehan |
| 2014/0276069 A1 | 9/2014 | Amble et al. |
| 2014/0276081 A1 | 9/2014 | Tegels |
| 2014/0276085 A1 | 9/2014 | Miller |
| 2014/0276690 A1 | 9/2014 | Grace |
| 2014/0296694 A1 | 10/2014 | Jaworski |
| 2014/0343431 A1 | 11/2014 | Vajinepalli et al. |
| 2014/0357994 A1 | 12/2014 | Jin et al. |
| 2015/0005738 A1 | 1/2015 | Blacker |
| 2015/0011887 A1 | 1/2015 | Ahn et al. |
| 2015/0065916 A1 | 3/2015 | Maguire et al. |
| 2015/0073279 A1* | 3/2015 | Cai ............ A61B 8/5207 600/463 |
| 2015/0112200 A1 | 4/2015 | Oberg et al. |
| 2015/0141821 A1 | 5/2015 | Yoshikawa et al. |
| 2015/0190111 A1 | 7/2015 | Fry |
| 2015/0209003 A1 | 7/2015 | Halmann et al. |
| 2015/0209113 A1 | 7/2015 | Burkholz et al. |
| 2015/0209510 A1 | 7/2015 | Burkholz et al. |
| 2015/0209526 A1 | 7/2015 | Matsubara et al. |
| 2015/0245820 A1 | 9/2015 | Tamada |
| 2015/0257735 A1 | 9/2015 | Ball et al. |
| 2015/0272448 A1 | 10/2015 | Fonte et al. |
| 2015/0282890 A1 | 10/2015 | Cohen et al. |
| 2015/0294497 A1 | 10/2015 | Ng et al. |
| 2015/0297097 A1 | 10/2015 | Matsubara et al. |
| 2015/0342572 A1 | 12/2015 | Tahmasebi Maraghoosh et al. |
| 2015/0359520 A1 | 12/2015 | Shan et al. |
| 2015/0359991 A1 | 12/2015 | Dunbar et al. |
| 2016/0000367 A1 | 1/2016 | Lyon |
| 2016/0000399 A1 | 1/2016 | Halmann et al. |
| 2016/0026894 A1 | 1/2016 | Nagase |
| 2016/0029995 A1 | 2/2016 | Navratil et al. |
| 2016/0038119 A1 | 2/2016 | Desjardins |
| 2016/0081674 A1 | 3/2016 | Bagwan et al. |
| 2016/0113517 A1 | 4/2016 | Lee et al. |
| 2016/0113699 A1 | 4/2016 | Sverdlik et al. |
| 2016/0120607 A1 | 5/2016 | Sorotzkin et al. |
| 2016/0125639 A1 | 5/2016 | Park et al. |
| 2016/0157831 A1 | 6/2016 | Kang et al. |
| 2016/0166232 A1 | 6/2016 | Merritt |
| 2016/0202053 A1 | 7/2016 | Walker et al. |
| 2016/0211045 A1 | 7/2016 | Jeon et al. |
| 2016/0213398 A1 | 7/2016 | Liu |
| 2016/0220124 A1 | 8/2016 | Grady et al. |
| 2016/0259992 A1 | 9/2016 | Knodt et al. |
| 2016/0278869 A1 | 9/2016 | Grunwald |
| 2016/0287214 A1 | 10/2016 | Ralovich et al. |
| 2016/0296208 A1 | 10/2016 | Sethuraman et al. |
| 2016/0374644 A1 | 12/2016 | Mauldin, Jr. et al. |
| 2017/0014105 A1 | 1/2017 | Chono |
| 2017/0020561 A1 | 1/2017 | Cox et al. |
| 2017/0079548 A1 | 3/2017 | Silverstein et al. |
| 2017/0086785 A1 | 3/2017 | Bjaerum |
| 2017/0090571 A1 | 3/2017 | Bjaerum et al. |
| 2017/0103534 A1 | 4/2017 | Park et al. |
| 2017/0143312 A1 | 5/2017 | Hedlund et al. |

(56) References Cited

U.S. PATENT DOCUMENTS

| | | |
|---|---|---|
| 2017/0164923 A1 | 6/2017 | Matsumoto |
| 2017/0172666 A1 | 6/2017 | Govari et al. |
| 2017/0215842 A1 | 8/2017 | Ryu et al. |
| 2017/0231553 A1 | 8/2017 | Igarashi et al. |
| 2017/0252004 A1 | 9/2017 | Broad et al. |
| 2017/0258522 A1 | 9/2017 | Goshgarian et al. |
| 2017/0259013 A1 | 9/2017 | Boyden et al. |
| 2017/0328751 A1 | 11/2017 | Lemke |
| 2017/0367678 A1 | 12/2017 | Sirtori et al. |
| 2018/0015256 A1 | 1/2018 | Southard et al. |
| 2018/0116723 A1 | 5/2018 | Hettrick et al. |
| 2018/0125450 A1 | 5/2018 | Blackbourne et al. |
| 2018/0161502 A1 | 6/2018 | Nanan et al. |
| 2018/0199914 A1 | 7/2018 | Ramachandran et al. |
| 2018/0214119 A1 | 8/2018 | Mehrmohammadi et al. |
| 2018/0228465 A1 | 8/2018 | Southard et al. |
| 2018/0235649 A1 | 8/2018 | Elkadi |
| 2018/0235709 A1 | 8/2018 | Donhowe et al. |
| 2018/0289927 A1 | 10/2018 | Messerly |
| 2018/0296185 A1 | 10/2018 | Cox et al. |
| 2018/0310955 A1 | 11/2018 | Lindekugel et al. |
| 2018/0333135 A1 | 11/2018 | Kim et al. |
| 2018/0344293 A1 | 12/2018 | Raju et al. |
| 2019/0029636 A1 | 1/2019 | Lee et al. |
| 2019/0060001 A1 | 2/2019 | Kohli et al. |
| 2019/0060014 A1 | 2/2019 | Hazelton et al. |
| 2019/0090855 A1 | 3/2019 | Kobayashi et al. |
| 2019/0125210 A1 | 5/2019 | Govari et al. |
| 2019/0200951 A1 | 7/2019 | Meier |
| 2019/0239848 A1 | 8/2019 | Bedi et al. |
| 2019/0239850 A1 | 8/2019 | Dalvin et al. |
| 2019/0307419 A1 | 10/2019 | Durfee |
| 2019/0307515 A1 | 10/2019 | Naito et al. |
| 2019/0307516 A1 | 10/2019 | Schotzko et al. |
| 2019/0365347 A1 | 12/2019 | Abe |
| 2019/0365348 A1 | 12/2019 | Toume et al. |
| 2019/0365354 A1 | 12/2019 | Du |
| 2020/0027210 A1 | 1/2020 | Haemel et al. |
| 2020/0069929 A1 | 3/2020 | Mason et al. |
| 2020/0107596 A1 | 4/2020 | Caruso et al. |
| 2020/0113540 A1 | 4/2020 | Gijsbers et al. |
| 2020/0163654 A1 | 5/2020 | Satir et al. |
| 2020/0200900 A1 | 6/2020 | Asami et al. |
| 2020/0229795 A1 | 7/2020 | Tadross et al. |
| 2020/0230391 A1 | 7/2020 | Burkholz et al. |
| 2020/0237403 A1* | 7/2020 | Southard ............... A61B 8/461 |
| 2020/0281563 A1 | 9/2020 | Muller et al. |
| 2020/0359990 A1 | 11/2020 | Poland et al. |
| 2020/0390416 A1 | 12/2020 | Swan et al. |
| 2021/0045716 A1 | 2/2021 | Shiran et al. |
| 2021/0059639 A1 | 3/2021 | Howell |
| 2021/0077058 A1 | 3/2021 | Mashood et al. |
| 2021/0093383 A1 | 4/2021 | Wang et al. |
| 2021/0137492 A1* | 5/2021 | Imai ..................... A61B 8/4254 |
| 2021/0146167 A1 | 5/2021 | Barthe et al. |
| 2021/0161510 A1 | 6/2021 | Sasaki et al. |
| 2021/0186467 A1 | 6/2021 | Urabe et al. |
| 2021/0212658 A1 | 7/2021 | McGrath et al. |
| 2021/0212668 A1 | 7/2021 | Li et al. |
| 2021/0267569 A1 | 9/2021 | Yamamoto |
| 2021/0267570 A1* | 9/2021 | Ulman ..................... G06T 5/40 |
| 2021/0295048 A1 | 9/2021 | Buras et al. |
| 2021/0315538 A1 | 10/2021 | Brandl et al. |
| 2021/0373602 A1 | 12/2021 | Min |
| 2021/0378627 A1 | 12/2021 | Yarmush et al. |
| 2022/0019313 A1 | 1/2022 | He et al. |
| 2022/0022969 A1 | 1/2022 | Misener |
| 2022/0039777 A1 | 2/2022 | Durfee |
| 2022/0039829 A1 | 2/2022 | Zijlstra et al. |
| 2022/0071593 A1 | 3/2022 | Tran |
| 2022/0096053 A1 | 3/2022 | Sethuraman et al. |
| 2022/0096797 A1 | 3/2022 | Prince |
| 2022/0104791 A1 | 4/2022 | Matsumoto |
| 2022/0104886 A1 | 4/2022 | Blanchard et al. |
| 2022/0117582 A1 | 4/2022 | McLaughlin et al. |
| 2022/0160434 A1 | 5/2022 | Messerly et al. |
| 2022/0168050 A1 | 6/2022 | Sowards et al. |
| 2022/0172354 A1 | 6/2022 | Misener et al. |
| 2022/0225963 A1 | 7/2022 | Sutton et al. |
| 2022/0233346 A1 | 7/2022 | McElya |
| 2022/0296303 A1 | 9/2022 | McLeod et al. |
| 2022/0304652 A1 | 9/2022 | Peterson et al. |
| 2022/0330922 A1 | 10/2022 | Sowards et al. |
| 2022/0334251 A1 | 10/2022 | Sowards et al. |
| 2022/0361840 A1 | 11/2022 | Matsumoto et al. |
| 2023/0048327 A1 | 2/2023 | Lampe et al. |
| 2023/0107629 A1 | 4/2023 | Sowards et al. |
| 2023/0113291 A1 | 4/2023 | de Wild et al. |
| 2023/0132148 A1 | 4/2023 | Sowards et al. |
| 2023/0135562 A1 | 5/2023 | Misener et al. |
| 2023/0135757 A1 | 5/2023 | Bauer et al. |
| 2023/0138970 A1 | 5/2023 | Sowards et al. |
| 2023/0148872 A1 | 5/2023 | Sowards et al. |
| 2023/0201539 A1 | 6/2023 | Howell |
| 2023/0277153 A1 | 9/2023 | Sowards et al. |
| 2023/0277154 A1 | 9/2023 | Sowards et al. |
| 2023/0298757 A1 | 9/2023 | Golan et al. |
| 2023/0338010 A1 | 10/2023 | Sturm |
| 2023/0371928 A1 | 11/2023 | Rajguru et al. |
| 2023/0397900 A1 | 12/2023 | Prince |
| 2024/0065673 A1 | 2/2024 | Sowards et al. |
| 2024/0307024 A1 | 9/2024 | Sowards et al. |
| 2025/0017559 A1 | 1/2025 | Denny et al. |
| 2025/0057501 A1 | 2/2025 | Prince |
| 2025/0104238 A1 | 3/2025 | Misener et al. |
| 2025/0177060 A1 | 6/2025 | Messerly et al. |
| 2025/0186026 A1 | 6/2025 | Tran |
| 2025/0251511 A1 | 8/2025 | Sowards et al. |

FOREIGN PATENT DOCUMENTS

| | | |
|---|---|---|
| EP | 0933063 A1 | 8/1999 |
| EP | 1504713 A1 | 2/2005 |
| EP | 1591074 B1 | 5/2008 |
| EP | 2823766 A1 | 1/2015 |
| EP | 3181083 A1 | 6/2017 |
| EP | 3870059 | 9/2021 |
| JP | 2000271136 A | 10/2000 |
| JP | 2007222291 A | 9/2007 |
| JP | 2014150928 A | 8/2014 |
| JP | 2018175547 A | 11/2018 |
| KR | 20180070878 A | 6/2018 |
| KR | 102176196 B1 | 11/2020 |
| WO | 2004082749 A2 | 9/2004 |
| WO | 2007115174 A2 | 10/2007 |
| WO | 2010029521 A2 | 3/2010 |
| WO | 2010076808 A1 | 7/2010 |
| WO | 2013059714 A1 | 4/2013 |
| WO | 2014115150 A1 | 7/2014 |
| WO | 2015017270 A1 | 2/2015 |
| WO | 2016081023 A1 | 5/2016 |
| WO | 2017096487 A1 | 6/2017 |
| WO | 2017214428 A1 | 12/2017 |
| WO | 2018026878 A1 | 2/2018 |
| WO | 2018134726 A1 | 7/2018 |
| WO | 2018138343 A1 | 8/2018 |
| WO | 2019232451 A1 | 12/2019 |
| WO | 2020002620 A1 | 1/2020 |
| WO | 2020016018 A1 | 1/2020 |
| WO | 2019232454 A9 | 2/2020 |
| WO | 2020044769 A1 | 3/2020 |
| WO | 2020067897 A1 | 4/2020 |
| WO | 2020083660 A1 | 4/2020 |
| WO | 2020186198 A1 | 9/2020 |
| WO | 2021123905 A2 | 6/2021 |
| WO | 2021198226 A1 | 10/2021 |
| WO | 2022069208 A1 | 4/2022 |
| WO | 2022072727 A2 | 4/2022 |
| WO | 2022081904 A1 | 4/2022 |
| WO | 2022115479 A1 | 6/2022 |
| WO | 2022119853 A1 | 6/2022 |
| WO | 2022119856 A1 | 6/2022 |
| WO | 2022221703 A1 | 10/2022 |
| WO | 2022221714 A1 | 10/2022 |

(56) References Cited

FOREIGN PATENT DOCUMENTS

| | | |
|---|---|---|
| WO | 2023059512 A1 | 4/2023 |
| WO | 2023/091424 A1 | 5/2023 |
| WO | 2023076268 A1 | 5/2023 |
| WO | 2023081220 A1 | 5/2023 |
| WO | 2023081223 A1 | 5/2023 |
| WO | 2023167866 A1 | 9/2023 |
| WO | 2023177718 A1 | 9/2023 |
| WO | 2024044277 A1 | 2/2024 |
| WO | 2024180503 A1 | 9/2024 |
| WO | 2025015198 A1 | 1/2025 |

OTHER PUBLICATIONS

PCT/US2023/014143 filed Feb. 28, 2023 International Search Report and Written Opinion dated Jun. 12, 2023.
U.S. Appl. No. 17/468,318, filed Sep. 7, 2021 Final Office Action dated Sep. 8, 2023.
U.S. Appl. No. 17/538,911, filed Nov. 30, 2021 Final Office Action dated Sep. 13, 2023.
U.S. Appl. No. 17/684,180, filed Mar. 1, 2022 Non-Final Office Action dated Jul. 28, 2023.
U.S. Appl. No. 17/722,151, filed Apr. 15, 2022 Non-Final Office Action dated Sep. 7, 2023.
U.S. Appl. No. 17/471,015, filed Sep. 9, 2021 Non-Final Office Action dated Mar. 28, 2024.
U.S. Appl. No. 17/684,180, filed Mar. 1, 2022 Advisory Action dated Apr. 4, 2024.
U.S. Appl. No. 17/684,180, filed Mar. 1, 2022 Non-Final Office Action dated May 8, 2024.
U.S. Appl. No. 17/722,111, filed Apr. 15, 2022 Final Office Action dated Jul. 12, 2024.
U.S. Appl. No. 17/722,151, filed Apr. 15, 2022 Non-Final Office Action dated Mar. 25, 2024.
U.S. Appl. No. 17/894,460, filed Aug. 24, 2022 Advisory Action dated Apr. 4, 2024.
U.S. Appl. No. 17/979,564, filed Nov. 2, 2022 Non-Final Office Action dated Jun. 5, 2024.
U.S. Appl. No. 18/238,281, filed Aug. 25, 2023 Non-Final Office Action dated Mar. 22, 2024.
U.S. Appl. No. 18/238,281, filed Aug. 25, 2023 Notice of Allowance dated Jul. 16, 2024.
PCT/US2022/045372 filed Sep. 30, 2022 International Search Report and Written Opinion dated Jan. 14, 2023.
PCT/US2024/037647 filed Jul. 11, 2024 International Search Report and Written Opinion dated Oct. 16, 2024.
Thermographic venous blood flow characterization with external cooling stimulation (Year: 2018).
U.S. Appl. No. 17/471,015, filed Sep. 9, 2021 Notice of Allowance dated Oct. 29, 2024.
U.S. Appl. No. 17/534,099, filed Nov. 23, 2021 Notice of Allowance dated Sep. 18, 2024.
U.S. Appl. No. 17/538,943, filed Nov. 30, 2021 Notice of Allowance dated Aug. 14, 2024.
U.S. Appl. No. 17/684,180, filed Mar. 1, 2022 Final Office Action dated Sep. 23, 2024.
U.S. Appl. No. 17/722,111, filed Apr. 15, 2022 Advisory Action dated Oct. 23, 2024.
U.S. Appl. No. 17/722,151, filed Apr. 15, 2022 Final Office Action dated Sep. 20, 2024.
U.S. Appl. No. 17/894,460, filed Aug. 24, 2022 Non-Final Office Action dated Sep. 25, 2024.
U.S. Appl. No. 17/957,562, filed Sep. 30, 2022 Non-Final Office Action dated Jun. 20, 2024.
U.S. Appl. No. 17/979,564, filed Nov. 2, 2022 Final Office Action dated Oct. 18, 2024.
U.S. Appl. No. 17/979,601, filed Nov. 2, 2022 Non-Final Office Action dated Aug. 20, 2024.
U.S. Appl. No. 17/987,698, filed Nov. 15, 2022 Non-Final Office Action dated Sep. 20, 2024.
M. Ikhsan, K. K. Tan, AS. Putra, C. F. Kong, et al., "Automatic identification of blood vessel cross-section for central venous catheter placement using a cascading classifier," 39th Annual International Conference of the IEEE Engineering in Medicine and Biology Society (EMBC). pp. 1489-1492 (Year: 2017).
U.S. Appl. No. 17/468,318, filed Sep. 7, 2021 Notice of Allowance dated Jan. 18, 2024.
U.S. Appl. No. 17/471,015, filed Sep. 9, 2021 Advisory Action dated Feb. 2, 2024.
U.S. Appl. No. 17/534,099, filed Nov. 23, 2021 Non-Final Office Action dated Mar. 14, 2024.
U.S. Appl. No. 17/538,911, filed Nov. 30, 2021 Notice of Allowance dated Mar. 14, 2024.
U.S. Appl. No. 17/538,943, filed Nov. 30, 2021 Non-Final Office Action dated Jan. 30, 2024.
U.S. Appl. No. 17/684,180, filed Mar. 1, 2022 Final Office Action dated Jan. 18, 2024.
U.S. Appl. No. 17/722,111, filed Apr. 15, 2022 Non-Final Office Action dated Dec. 22, 2023.
U.S. Appl. No. 17/722,151, filed Apr. 15, 2022 Advisory Action dated Jan. 2, 2024.
U.S. Appl. No. 17/894,460, filed Aug. 24, 2022 Final Office Action dated Jan. 31, 2024.
PCT/US2022/025097 filed Apr. 15, 2021 International Preliminary Report on Patentability dated Oct. 26, 2023.
PCT/US2023/030970 filed Aug. 23, 2023 International Search Report and Written Opinion dated Oct. 30, 2023.
U.S. Appl. No. 17/468,318, filed Sep. 7, 2021 Advisory Action dated Nov. 6, 2023.
U.S. Appl. No. 17/471,015, filed Sep. 9, 2021 Final Office Action dated Oct. 12, 2023.
U.S. Appl. No. 17/534,099, filed Nov. 23, 2021 Advisory Action dated Dec. 8, 2023.
U.S. Appl. No. 17/534,099, filed Nov. 23, 2021 Final Office Action dated Sep. 29, 2023.
U.S. Appl. No. 17/538,911, filed Nov. 30, 2021 Advisory Action dated Nov. 22, 2023.
U.S. Appl. No. 17/722,151, filed Apr. 15, 2022 Final Office Action dated Nov. 6, 2023.
U.S. Appl. No. 17/894,460, filed Aug. 24, 2022 Non-Final Office Action dated Nov. 6, 2023.
Lu Zhenyu et al "Recent advances in 5 robot-assisted echography combining perception control and cognition." Cognitive Computation and Systems the Institution of Engineering and Technology, Michael Faraday House, Six Hills Way, Stevenage Herts. SG1 2AY UK vol. 2 No. 3 Sep. 2, 2020 (Sep. 2, 2020).
Pagoulatos, N. et al. "New spatial localizer based on fiber optics with applications in 3D ultrasound imaging" Proceeding of Spie, vol. 3976 (Apr. 18, 2000; Apr. 18, 2000).
PCT/US2021/049294 filed Sep. 7, 2021 International Search Report and Written Opinion dated Dec. 8, 2021.
PCT/US2021/049712 filed Sep. 9, 2021 International Search Report and Written Opinion dated Dec. 14, 2021.
PCT/US2021/060622 filed Nov. 23, 2021 International Search Report and Written Opinion dated Mar. 3, 2022.
PCT/US2021/061267 filed Nov. 30, 2021 International Search Report and Written Opinion dated Mar. 9, 2022.
PCT/US2021/061276 filed Nov. 30, 2021 International Search Report and Written Opinion dated Mar. 9, 2022.
PCT/US2022/025082 filed Apr. 15, 2022 International Search Report and Written Opinion dated Jul. 11, 2022.
PCT/US2022/025097 filed Apr. 15, 2022 International Search Report and Written Opinion dated Jul. 8, 2022.
PCT/US2022/048716 filed Nov. 2, 2022 International Search Report and Written Opinion dated Feb. 24, 2023.
PCT/US2022/048722 filed Nov. 2, 2022 International Search Report and Written Opinion dated Feb. 24, 2023.
PCT/US2022/049983 filed Nov. 15, 2022 International Search Report and Written Opinion dated Mar. 29, 2023.
PCT/US2022047727 filed Oct. 25, 2022 International Search Report and Written Opinion dated Jan. 25, 2023.
PCT/US2023/015266 filed Mar. 15, 2023 International Search Report and Written Opinion dated May 25, 2023.

(56) References Cited

OTHER PUBLICATIONS

Saxena Ashish et al Thermographic venous blood flow characterization with external cooling stimulation Infrared Physics and Technology Elsevier Science GB vol. 90 Feb. 9, 2018 Feb. 9, 2018 pp. 8-19 XP085378852.
Sebastian Vogt: "Real-Time Augmented Reality for Image-Guided Interventions", Oct. 5, 2009, XPO55354720, Retrieved from the Internet: URL: https://opus4.kobv.de/opus4-fau/frontdoor/deliver/index/docld/1235/file/SebastianVogtDissertation.pdf.
U.S. Appl. No. 15/650,474, filed Jul. 14, 2017 Final Office Action dated Jun. 2, 2020.
U.S. Appl. No. 15/650,474, filed Jul. 14, 2017 Non-Final Office Action dated Dec. 16, 2019.
U.S. Appl. No. 15/650,474, filed Jul. 14, 2017 Notice of Allowance dated Dec. 11, 2020.
U.S. Appl. No. 15/650,474, filed Jul. 14, 2017 Notice of Allowance dated Mar. 1, 2021.
U.S. Appl. No. 17/020,476, filed Sep. 14, 2020 Advisory Action dated Aug. 19, 2022.
U.S. Appl. No. 17/020,476, filed Sep. 14, 2020 Final Office Action dated Jan. 5, 2023.
U.S. Appl. No. 17/020,476, filed Sep. 14, 2020 Final Office Action dated Jun. 9, 2022.
U.S. Appl. No. 17/020,476, filed Sep. 14, 2020 Non-Final Office Action dated Feb. 9, 2022.
U.S. Appl. No. 17/020,476, filed Sep. 14, 2020 Non-Final Office Action dated Sep. 23, 2022.
U.S. Appl. No. 17/020,476, filed Sep. 14, 2020 Notice of Allowance dated Apr. 28, 2022.
U.S. Appl. No. 17/468,318, filed Sep. 7, 2021 Non-Final Office Action dated Apr. 12, 2023.
U.S. Appl. No. 17/471,015, filed Sep. 9, 2021 Non-Final Office Action dated Aug. 16, 2022.
U.S. Appl. No. 17/471,015, filed Sep. 9, 2021 Non-Final Office Action dated Mar. 30, 2023.
U.S. Appl. No. 17/534,099, filed Nov. 23, 2021 Non-Final Office Action dated Mar. 31, 2023.
U.S. Appl. No. 17/538,911, filed Nov. 30, 2021 Non-Final Office Action dated Mar. 2, 2023.
U.S. Appl. No. 17/684,180, filed Mar. 1, 2022 Restriction Requirement dated May 19, 2023.
William F Garrett et al: "Real-time incremental visualization of dynamic ultrasound volumes using parallel BSP trees", Visualization '96. Proceedings, IEEE, NE, Oct. 27, 1996, pp. 235-ff, XPO58399771, ISBN: 978-0-89791-864-0 abstract, figures 1-7, pp. 236-240.
U.S. Appl. No. 17/684,180, filed Mar. 1, 2022 Advisory Action dated Dec. 27, 2024.
U.S. Appl. No. 17/684,180, filed Mar. 1, 2022 Non-Final Office Action dated Jan. 17, 2025.
U.S. Appl. No. 17/722,111, filed Apr. 15, 2022 Notice of Allowance dated Dec. 18, 2024.
U.S. Appl. No. 17/722,151, filed Apr. 15, 2022 Advisory Action dated Dec. 27, 2024.
U.S. Appl. No. 17/894,460, filed Aug. 24, 2022 Advisory Action dated Mar. 13, 2025.
U.S. Appl. No. 17/894,460, filed Aug. 24, 2022 Final Office Action dated Dec. 31, 2024.
U.S. Appl. No. 17/957,562, filed Sep. 30, 2022 Advisory Action dated Feb. 12, 2025.
U.S. Appl. No. 17/957,562, filed Sep. 30, 2022 Final Office Action dated Nov. 27, 2024.
U.S. Appl. No. 17/973,171, filed Oct. 25, 2022 Non-Final Office Action dated Dec. 6, 2024.
U.S. Appl. No. 17/979,564, filed Nov. 2, 2022 Advisory Action dated Jan. 17, 2025.
U.S. Appl. No. 17/979,601, filed Nov. 2, 2022 Advisory Action dated Feb. 11, 2025.
U.S. Appl. No. 17/979,601, filed Nov. 2, 2022 Final Office Action dated Dec. 5, 2024.
U.S. Appl. No. 17/987,698, filed Nov. 15, 2022 Advisory Action dated Feb. 21, 2025.
U.S. Appl. No. 17/987,698, filed Nov. 15, 2022 Final Office Action dated Dec. 13, 2024.
U.S. Appl. No. 18/113,003, filed Feb. 22, 2023 Non-Final Office Action dated Nov. 27, 2024.
U.S. Appl. No. 18/674,601, filed May 24, 2024 Non-Final Office Action dated Jan. 7, 2025.
U.S. Appl. No. 17/684,180 filed Mar. 1, 2022 Final Office Action dated May 29, 2025.
U.S. Appl. No. 17/722,151 filed Apr. 15, 2022 Non-Final Office Action dated Mar. 21, 2025.
U.S. Appl. No. 17/973,171 filed Oct. 25, 2022 Final Office Action dated Apr. 3, 2025.
U.S. Appl. No. 17/979,564, filed Nov. 2, 2022 Examiner's Answer dated May 30, 2025.
U.S. Appl. No. 17/979,601, filed Nov. 2, 2022 Notice of Allowance dated Mar. 27, 2025.
U.S. Appl. No. 17/987,698, filed Nov. 15, 2022 Non-Final Office Action dated May 23, 2025.
U.S. Appl. No. 18/113,003, filed Feb. 22, 2023 Final Office Action dated Apr. 29, 2025.
U.S. Appl. No. 18/221,318 filed Jul. 12, 2023 Restriction Requirement dated Mar. 28, 2025.
U.S. Appl. No. 18/674,601, filed May 24, 2024 Notice of Allowance dated Mar. 26, 2025.
Chen et al., 3D near infrared and ultrasound imaging of peripheral blood vessels for real-time localization and needle guidance. InMedical Image Computing and Computer-Assisted Intervention-MICCAI 2016 (pp. 388-396) (Year: 2016).
U.S. Appl. No. 17/722,151 filed Apr. 15, 2022 Final Office Action dated Jul. 11, 2025.
U.S. Appl. No. 17/957,562 filed Sep. 30, 2022 Examiner's Answer dated Jun. 16, 2025.
U.S. Appl. No. 17/973,171 filed Oct. 25, 2022 Advisory Action dated Jun. 30, 2025.
U.S. Appl. No. 18/113,003 filed Feb. 22, 2023 Advisory Action dated Jul. 2, 2025.
U.S. Appl. No. 18/221,318 filed Jul. 12, 2023 Non-Final Office Action dated Jun. 23, 2025.

\* cited by examiner

ULTRASOUND IMAGING SYSTEM

PRIORITY

This application claims the benefit of priority to U.S. Provisional Application No. 63/320,582, filed Mar. 16, 2022, which is incorporated by reference in its entirety into this application.

BACKGROUND

During an ultrasound procedure, a technician may take a multitude of ultrasound images. The technician must assess each image to assemble an optimized image set to send to a clinician for further evaluation. This process of assessing each image may occur during the procedure, potentially prolonging the procedure for the patient, or may also occur after the procedure has been completed, potentially missing important ultrasound images. It would be beneficial to the technician, the clinician, and the patient to have an ultrasound imaging system that can automatically assess and determine one or more ideal ultrasound images from an ultrasound image set. Disclosed herein is an ultrasound imaging system and a method of use that address the foregoing.

SUMMARY

Disclosed herein is an ultrasound imaging system configured to capture a plurality of ultrasound images and determine one or more optimal ultrasound images from the plurality of ultrasound images. The ultrasound imaging system includes an ultrasound probe having an ultrasound array configured to capture the plurality of ultrasound images of a target vessel and other anatomical targets within a target area. The ultrasound imaging system further includes a console in communication with the ultrasound array, the console configured to: (i) detect one or more vessel characteristics of the target vessel, (ii) determine one or more vessel characteristic values from the one or more vessel characteristics, and (iii) compare each vessel characteristic value with one or more vessel characteristic thresholds to determine one or more optimal ultrasound images from the plurality of ultrasound images.

In some embodiments, the one or more vessel characteristic include a target vessel shape, a target vessel size, a target vessel circularity, a target vessel depth, and a target vessel cross-sectional area.

In some embodiments, the one or more optimal ultrasound images include one or more ultrasound images having one or more vessel characteristic values that comply with one or more of the vessel characteristic thresholds.

In some embodiments, the one or more vessel characteristic thresholds include a maximum vessel characteristic threshold, an average vessel characteristic threshold, and a minimum vessel characteristic threshold.

In some embodiments, the one or more optimal ultrasound images include one or more ultrasound images having one or more vessel characteristic values that comply with each of the maximum vessel characteristic thresholds.

In some embodiments, the one or more optimal ultrasound images include one or more ultrasound images having one or more vessel characteristic values that comply with each of the minimum vessel characteristic thresholds.

In some embodiments, the one or more optimal ultrasound images include one or more ultrasound images having one or more vessel characteristic values that comply with each of the average vessel characteristic thresholds.

In some embodiments, the ultrasound imaging system includes a display in communication with the console, the display configured to depict the one or more optimal ultrasound images and one or more icons relating to one or more of each of the vessel characteristic values.

In some embodiments, the ultrasound probe includes a gyroscope in communication with the console, the gyroscope configured to detect movement of the ultrasound probe including one or more ultrasound probe gestures.

In some embodiments, the console includes one or more processors, an energy source, non-transitory computer readable medium, and a plurality of logic modules.

In some embodiments, the plurality of logic modules, when activated by the processor, are configured to perform operations including capturing and receiving the plurality of ultrasound images, analyzing each ultrasound image to determine a vessel characteristic value for each desired vessel characteristic, determining one or more vessel characteristic thresholds, comparing each vessel characteristic value to each vessel characteristic threshold to determine one or more optimal ultrasound image, and detecting ultrasound probe movement.

In some embodiments, the ultrasound array is configured to capture the plurality of ultrasound images when each of the vessel characteristic values are above vessel characteristic thresholds.

In some embodiments, the ultrasound array is configured to capture the plurality of ultrasound images when the gyroscope detects the one or more ultrasound probe gestures.

In some embodiments, the ultrasound array is configured to capture the plurality of ultrasound images when the console detects compression of the target vessel.

In some embodiments, each of the vessel characteristic thresholds are informed by dimensions of a vascular access device configured to be placed within the target vessel.

In some embodiments, the dimensions of the vascular access device are communicated to the console by an RFID tag, a barcode, or a user input.

In some embodiments, each of the vessel characteristic thresholds are informed by at least one of a desired percentage of target vessel occupancy or a desired target vessel occupancy diameter.

In some embodiments, each of the vessel characteristic thresholds are informed by at least one of a desired target vessel depth or a desired target vessel purchase.

Also disclosed herein is a method of capturing a plurality of ultrasound images and determining one or more optimal ultrasound images from the plurality of ultrasound images. The method includes capturing a plurality of ultrasound images of a target vessel, setting vessel characteristic value thresholds for each desired vessel characteristic to be detected, determining each of one or more vessel characteristic values of the target vessel, analyzing which of the vessel characteristic values meet each maximum characteristic value threshold, analyzing which of the vessel characteristic values meet or exceed each average characteristic value threshold, analyzing which of the vessel characteristic values meet or exceed each minimum characteristic value threshold, and displaying each of the optimal ultrasound images on a display in communication with a console.

In some embodiments, capturing a plurality of ultrasound images of a target vessel includes using an ultrasound probe having an ultrasound array in communication with the console to capture the plurality of ultrasound images.

In some embodiments, capturing the plurality of ultrasound images of the target vessel includes an image capturing event triggering the ultrasound array to capture the plurality of ultrasound images.

In some embodiments, the image capturing event includes a user generated image capturing event including one or more ultrasound probe gestures, touch screen activation of the display, pressing of a button on the ultrasound probe, or voice activation.

In some embodiments, the image capturing event includes a console generated image capturing event including detected compression of the target vessel or vessel characteristic values meeting or exceeding vessel characteristic value thresholds.

In some embodiments, setting vessel characteristic value thresholds for each desired vessel characteristic includes using dimensions of a vascular access device configured to be inserted into the target vessel to set vessel characteristic value thresholds for each desired vessel characteristic.

In some embodiments, setting vessel characteristic value thresholds for each desired vessel characteristic includes using at least one of a desired percentage of target vessel occupancy or a desired target vessel occupancy diameter to set vessel characteristic value thresholds for each desired vessel characteristic.

In some embodiments, displaying each of the optimal ultrasound images on a display in communication with the console includes displaying each of the optimal ultrasound images having vessel characteristic values that comply with each maximum characteristic value threshold.

In some embodiments, displaying each of the optimal ultrasound images on a display in communication with the console includes displaying each of the optimal ultrasound images having vessel characteristic values that meet or exceed each minimum characteristic value threshold.

In some embodiments, displaying each of the optimal ultrasound images on a display in communication with the console includes displaying each of the optimal ultrasound images having vessel characteristic values that meet or exceed each average characteristic value threshold.

These and other features of the concepts provided herein will become more apparent to those of skill in the art in view of the accompanying drawings and following description, which describe particular embodiments of such concepts in greater detail.

DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DESCRIPTION

Figure 1:
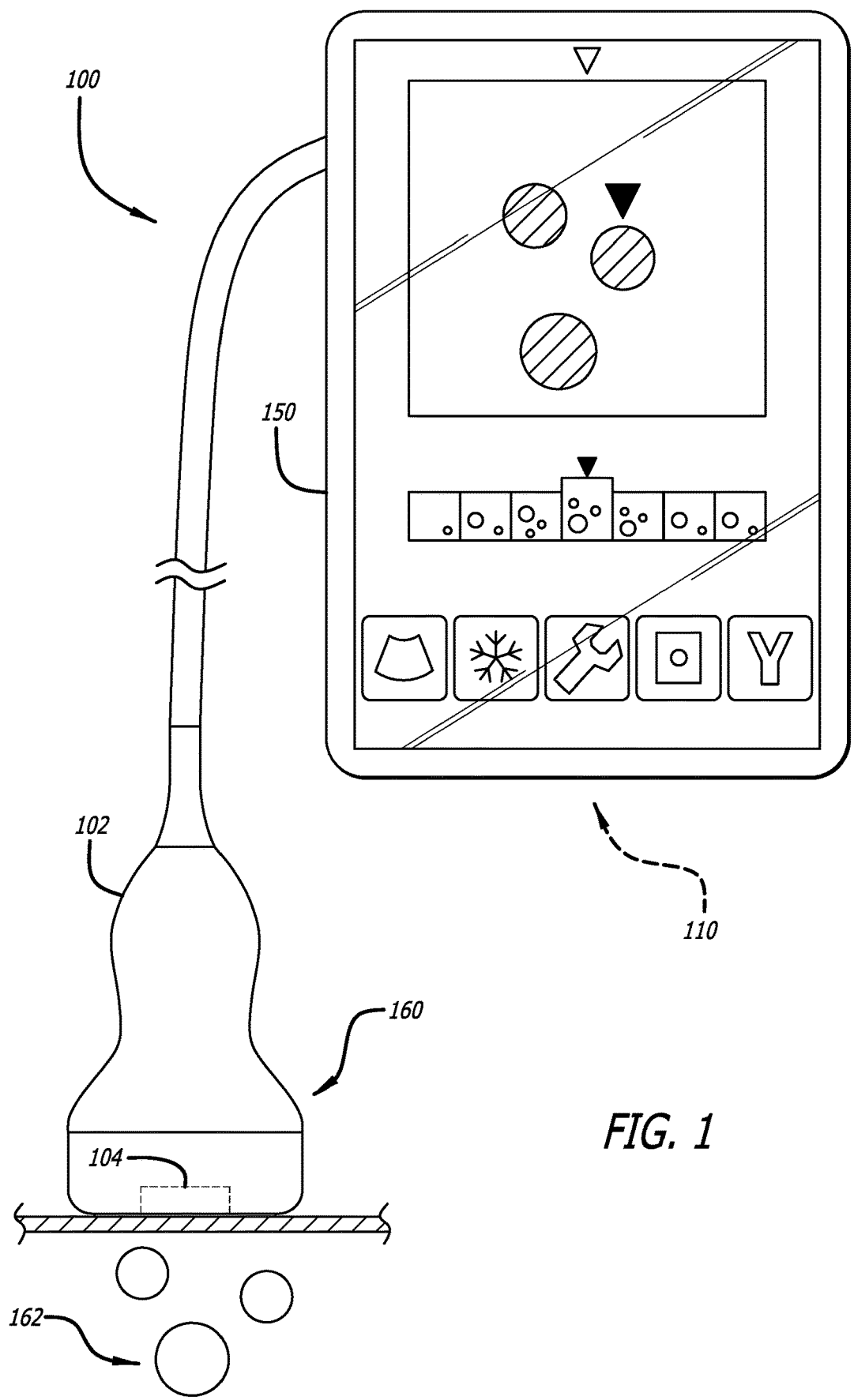
FIG. 1 illustrates a perspective view of an ultrasound imaging system, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The term "logic" may be representative of hardware, firmware or software that is configured to perform one or more functions. As hardware, the term logic may refer to or include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the term logic may refer to or include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic may be stored in persistent storage.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method. Additionally, all embodiments disclosed herein are combinable and/or interchangeable unless stated otherwise or such combination or interchange would be contrary to the stated operability of either embodiment.

Unless defined otherwise, all technical and scientific terms used herein have the same meaning as commonly understood by those of ordinary skill in the art.

FIG. 1 illustrates a cross-sectional view of an ultrasound imaging system ("system") 100 in accordance with some embodiments. In some embodiments, the system 100 includes an ultrasound probe 102 having an ultrasound array 104 (e.g., a plurality of ultrasound transducers in an array) in communication with a console 110. In some embodiments, the console 110 may be configured to be in communication with a display 150 so as to display ultrasound images captured by the ultrasound array 104. In some embodiments, the console 110 may be coupled to or integrated into the display 150. In some embodiments, all or a portion of the console 110 may be coupled to or integrated into the ultrasound probe 102. In some embodiments, the ultrasound probe 102, having the ultrasound array 104, may be positioned over or within a target area 160 to capture ultrasound images of blood vessels such as the target vessel 162, for example or other anatomical targets. In some embodiments, the console 110 may be configured to receive each of the plurality of ultrasound images and automatically identify one or more optimal ultrasound images from the plurality of captured ultrasound images. The optimal ultrasound image(s) may be displayed on the display 150 for visual confirmation by a user (e.g., a technician or clinician) to confirm that each optimal ultrasound image includes optimal depictions (or depicts optimal characteristics) of shape, size, circularity, depth, area, or the like of the target vessel 162, as will be described in more detail herein. Advantageously, being able to automatically determine one or more optimal ultrasound images from the plurality of captured ultrasound images removes the subjectivity of the clinician determining the one or more optimal ultrasound images, ensures the each optimal ultrasound image displays optimal characteristics of the target vessel 162, and allows the clinician or technician to focus on capturing the ultrasound images while simultaneously receiving feedback on different detected target vessel characteristics within the captured ultrasound images.

Figure 2:
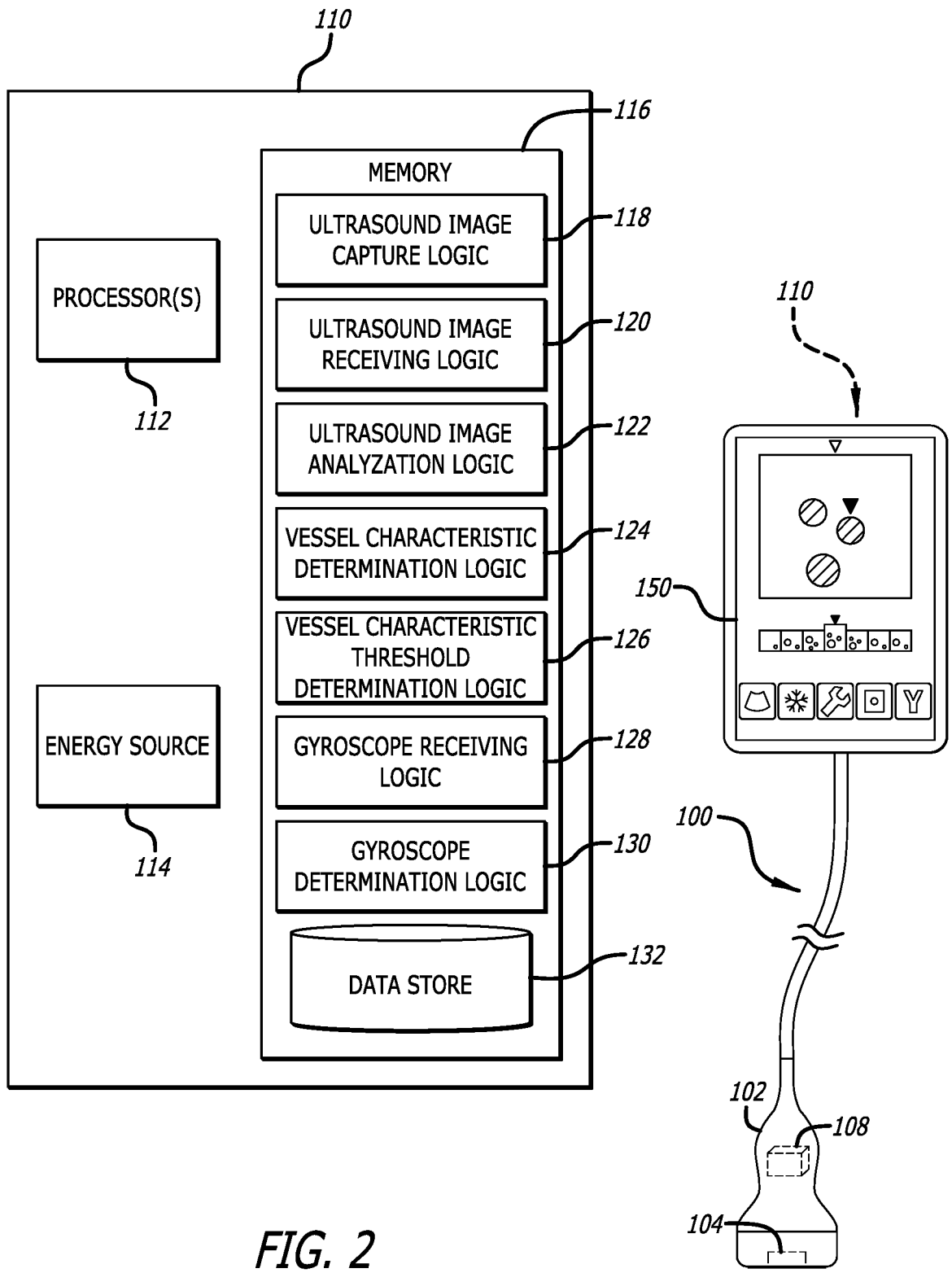
FIG. 2 illustrates a block diagram of a console of the ultrasound imaging system if FIG. 1, in accordance with some embodiments.

FIG. 2 illustrates a block diagram of some components of the system 100 including the console 110 in accordance with some embodiments. In some embodiments, a gyroscope 108 may be integrated within the ultrasound probe 102, where the gyroscope 108 is in communication with the console 110. In some embodiments, the gyroscope 108 may be configured to detect three-dimensional movement of the ultrasound probe 102 within the target area 160. In some embodiments, the console 110 may use detected movement of the ultrasound probe 102 to capture one more ultrasound images, as will be described in more detail herein.

In some embodiments, the console 110 may include one or more processors 112, an energy source 114, non-transitory computer readable medium ("memory") 116, and a plurality of logic modules. In some embodiments, the plurality of logic modules may include one or more of an ultrasound image capture logic 118, an ultrasound image receiving logic 120, an ultrasound image analyzation logic 122, a vessel characteristic determination logic 124, a vessel characteristic threshold determination logic 126, a gyroscope receiving logic 128, a gyroscope determination logic 130, and a data store 132.

In some embodiments, the ultrasound image capture logic 118 may be configured to activate the ultrasound array 104 to capture ultrasound images. In some embodiments, the ultrasound image capture logic 118 may be configured to be capturing (i.e., repeatedly capture) the plurality of ultrasound images during scanning of the target area. In some embodiments, the ultrasound image capture logic 118 may be configured to be triggered or activated by an image capturing event. In some embodiments, the image-capturing event may include a user-generated image capturing event or a console generated image capturing event. For example, a user generated image capturing event may include a button press on the ultrasound probe 102, a press of a touch screen on the display 150, a voice activation communicated to the console 110, an ultrasound probe gesture detected by the gyroscope 108, or the like. In some embodiments, the ultrasound probe gesture may include a defined movement set (e.g., a defined combination of moves) of the ultrasound probe 102, a period of rest (e.g., a period of time lacking ultrasound probe movement), or the like. In some embodiments, the console generated image capturing event may include the console 110 determining that all detected vessel characteristics or portions of the detected vessel characteristics of the target vessel 162 are optimal for capture, and activate the ultrasound image capture logic 118 to capture additional ultrasound images of the target vessel 162, as will be described in more detail herein. In some embodiments, the console generated image capturing event may include the console 110 detecting compression (or crushing) of the target vessel 162.

In some embodiments, the ultrasound image receiving logic 120 may be configured to receive the one or more ultrasound images captured from the ultrasound array 104. In some embodiments, the ultrasound image analyzation logic 122 may be configured to analyze each ultrasound image for specific vessel characteristics of the target vessel 162 and/or other anatomical targets to identify one or more optimal ultrasound images of the target area 160. In some embodiments, the ultrasound image analyzation logic 122 may be configured to analyze each ultrasound image as each ultrasound image is acquired or may be activated to analyze each ultrasound image after all the ultrasound images have been captured. In some embodiments, the ultrasound image analyzation logic 122 may be automatically triggered following capture of ultrasound images or may be triggered at a later time point. In some embodiments, the ultrasound image analyzation logic 122 may be configured to activate the vessel characteristic determination logic 124. In some embodiments, the ultrasound image analyzation logic 122 may be configured to automatically identify the target vessel 162 from other anatomical targets within each ultrasound image. In some embodiments, the ultrasound image analyzation logic 122 may be configured to identify the target vessel 162 using input from the user including a desired target vessel depth, a desired vessel purchase by length, or the like. In some embodiments, the ultrasound image analyzation logic 122 may be configured to determine the type of the vessel (e.g., artery versus vein).

In some embodiments, the vessel characteristic determination logic 124 may be configured to determine a vessel characteristic value for each desired vessel characteristic detected of the target vessel 162 or other anatomical targets. For example, the vessel characteristic determination logic 124 may be configured to determine desired vessel characteristics including the target vessel shape, the target vessel size, the target vessel circularity, the target vessel depth, the target vessel area including a cross-sectional area or the like, and may generate a numerical value for each vessel characteristic of the target vessel 162. In some embodiments, the vessel characteristic determination logic 124 may be configured to actively determine each of the vessel characteristics as each ultrasound image is captured. In some embodiments, the vessel characteristic determination logic 124 may be configured to alert or notify the user as to the value of each of the detected vessel characteristic values. In some embodiments, the vessel characteristic determination logic 124 may be configured to continuously monitor each vessel characteristic value as additional ultrasound images are captured and notify the user as to the new value or previous value of each of the detected vessel characteristic values.

In some embodiments, the vessel characteristic threshold determination logic 126 may be configured to determine a minimum threshold ("minimum vessel characteristic threshold"), a maximum threshold ("maximum vessel characteristic threshold"), and/or an average threshold ("average vessel characteristic threshold") for each vessel characteristic value. For example, if the vessel characteristic is the target vessel size, the vessel characteristic threshold determination logic 126 may be configured to determine a minimum target vessel size threshold, an average target vessel size threshold, and a maximum target vessel size threshold. In some embodiments, each of the minimum threshold, the maximum threshold, and the average threshold may be numerical values on a numerical scale (e.g., on a scale of 1-10, 1-20, 1-100, or the like). In some embodiments, the minimum threshold, maximum threshold, and average threshold may be determined by the user using the display 150 in communication with the console 110. In some embodiments, the minimum threshold, the maximum threshold, and the average threshold may be automatically determined by the console 110 using information provided by the user. For example, each of the minimum thresholds, the maximum thresholds, and the average thresholds may be defined in accordance with dimensions of a vascular access device configured to be placed into the target vessel 162. In some embodiments, the dimensions of the vascular access device may be communicated to the console 110 via an RFID tag, a barcode, a user input, or the like. In some embodiments, a desired percentage of target vessel occupancy or a desired target vessel occupancy diameter may inform (i.e., utilized to define) each of the minimum thresholds, the maximum thresholds, and the average thresholds. In some embodiments, a desired target vessel depth or a desired target vessel purchase by length may inform each of the minimum vessel characteristic thresholds, the maximum vessel characteristic thresholds, and the average vessel characteristic thresholds.

In some embodiments, the vessel characteristic threshold determination logic 126 may compare each vessel characteristic value with each determined vessel characteristic threshold (e.g., minimum threshold, average threshold, and maximum threshold) to determine the optimal ultrasound image. For example, ultrasound images that have high vessel characteristic values that meet or do not exceed (i.e., comply with) the maximum threshold for each of the target vessel characteristic (e.g., target vessel shape, target vessel size, target vessel circularity, target vessel depth, target vessel area, or the like) may be determined to be optimal images. In some embodiments, ultrasound images that have high vessel characteristic values that exceed the maximum threshold for some of the target vessel characteristics and vessel characteristic values that exceed the average threshold for some of the target vessel characteristics may still be determined to be optimal images. In some embodiments, ultrasound images that have vessel characteristic values that exceed the average threshold for some of the target vessel characteristics and vessel characteristic values that exceed the minimum threshold for some of the target vessel characteristics may be determined to be usable images and submitted to the user for approval. In some embodiments, ultrasound images where all vessel characteristic values exceed the minimum threshold of the vessel characteristic values may be determined to be usable images and submitted/presented to the user for approval.

In some embodiments, ultrasound images, where all vessel characteristic values are below the minimum threshold of the vessel characteristic values, may be submitted to user as sub-optimal images. In some embodiments, the vessel characteristic threshold determination logic 126 may indicate/depict each vessel characteristic value and the minimum threshold, average threshold, and maximum threshold on the ultrasound image as feedback for the user. In some embodiments, the vessel characteristic threshold determination logic 126 may be configured to alert the user when each minimum vessel characteristic threshold, average vessel characteristic threshold, or maximum vessel characteristic threshold has been met or exceed by each vessel characteristic value of an ultrasound image.

In some embodiments, optimal image selection may be driven by all the vessel characteristic values exceeding each maximum vessel characteristic threshold. In some embodiments, optimal image selection may be driven by all the vessel characteristic values exceeding each average threshold. In some embodiments, optimal image selection may be driven by all the vessel characteristic values exceeding each minimum threshold.

In some embodiments, the gyroscope receiving logic 128 may be configured to receive gyroscope values from the gyroscope 108. In some embodiments, the gyroscope determination logic 130 may be configured to determine if the ultrasound probe 102 is moving. In some embodiments, the gyroscope determination logic 130 may compare gyroscope values with a movement threshold to determine if the ultrasound probe is moving. In some embodiments, the gyroscope determination logic 130 may be configured to track and determine a movement set of the gyroscope 108, compare the movement set of the gyroscope 108 with a defined movement set, and communicate the defined movement to the ultrasound image capture logic 118 to capture one or more ultrasound images.

In some embodiments, the data store 132 may be configured to store ultrasound images with each vessel characteristic value along with the minimum threshold, average threshold, and/or maximum threshold for each characteristic value. In some embodiments, the vessel characteristic threshold determination logic 126 may be configured to use historical data in the data store 132 in determining the minimum threshold, average threshold, or maximum threshold for each characteristic value. For example, a characteristic value of a 7 on a 1-10 scale may historically have been determined to be the average threshold for target vessel circularity, however as more images are captured, the average threshold may rise to an 8 or fall to a 6 on the 1-10 scale and the average threshold for target vessel circularity may change in accordance. In some embodiments, the vessel characteristic determination logic 124 may use the historical data in the data store 132 to determine each vessel characteristic value.

Figures 3A, 3B:
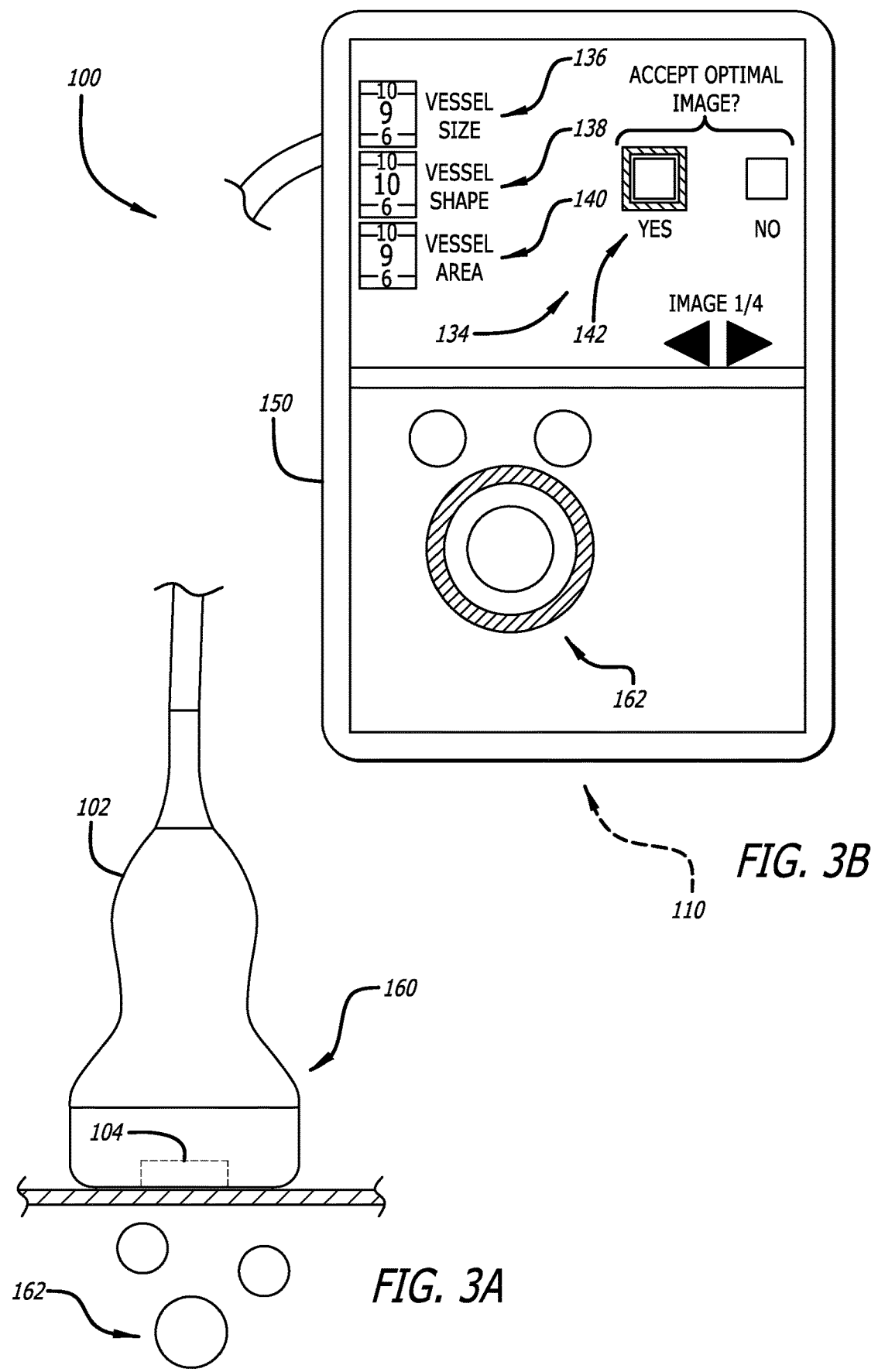
FIG. 3A illustrates a cross-sectional view of an exemplary method of detecting a target vessel, in accordance with some embodiments.
FIG. 3B illustrates a perspective view of an optimized ultrasound image of FIG. 3A shown on the display, in accordance with some embodiments.

FIG. 3A illustrates a cross-sectional view of an exemplary method of detecting the target vessel 162 using the ultrasound imaging system 100, in accordance with some embodiments. The ultrasound probe 102 may be brought into the target area 160 to capture a plurality of ultrasound images of the target vessel 162. In some embodiments, the console 110 may be configured to receive and analyze the plurality of ultrasound images for one or more optimal ultrasound images and display the one or more optimal ultrasound images on the display 150. As illustrated in FIG. 3A, in some embodiments, the target vessel 162 may demonstrate an optimal vessel size, vessel shape, and vessel area compared to other vessels within the target area 160.

FIG. 3B illustrates a perspective view of an optimized ultrasound image of FIG. 3A shown on the display 150, in accordance with some embodiments. The console 110 may be configured to detect each of the vessels and other anatomical targets within the target area 160 within each of the plurality of ultrasound images. The console 110 may be configured to determine which vessel is the target vessel 162 and evaluate the target vessel 162 for various vessel characteristics to determine one or more optimal ultrasound images. As illustrated in FIG. 3B, the display 150 is configured to display one of the selected optimal ultrasound images. The display 150 may be configured to display each of the optimal ultrasound images and a variety of icons relating to one or more of each of the various vessel characteristics detected. For example, the display 150 may be configured to display a vessel size icon 136, a vessel shape icon 138, a vessel area icon 140, and a confirmation icon 142. In some embodiments, the vessel size icon 136 may be configured to display each of the vessel size maximum threshold value, the vessel size minimum threshold value, and a detected vessel size value to indicate to the user where the detected target vessel size exists in relation to the vessel size maximum threshold value and the vessel size minimum threshold value. In some embodiments, the vessel shape icon 138 may be configured to display each of the vessel shape maximum threshold value, the vessel size minimum threshold value, and a detected vessel shape value to indicate to the user where the detected target vessel shape exists in relation to the vessel shape maximum threshold value and the vessel shape minimum threshold value.

For example, in FIG. 3B, each of the detected target vessel size, target vessel shape, and target vessel area are optimal in the ultrasound image displayed on the display 150. The vessel size icon 136 indicates the target vessel size displayed as "9" is slightly below the target vessel size maximum threshold of "10" but above the target vessel size minimum threshold of "6". The vessel shape icon 138 indicates the target vessel shape displayed as "10" is at the target vessel shape maximum threshold of "10" and above the target vessel shape minimum threshold of "6". The vessel area icon 140 indicates the target vessel area displayed as "9" is slightly below the target vessel area maximum threshold of "10" but above the target vessel area minimum threshold of "6".

In some embodiments, the vessel area icon 140 may be configured to display each of the vessel area maximum threshold value, the vessel area minimum threshold value, and a detected vessel area value to indicate to the user where the detected vessel area value exists in relation to the vessel area maximum threshold value and the vessel area minimum threshold value. In some embodiments, the confirmation icon 142 may include a confirmation prompt displayed for the user to visually confirm that each of the displayed ultrasound images are an optimal ultrasound image. Furthermore, the confirmation icon 142 may include an optimal image indicator configured to indicate to the user the number of optimal ultrasound images the console 110 detected and analyzed from the plurality of ultrasound images.

Figures 3C, 3D:
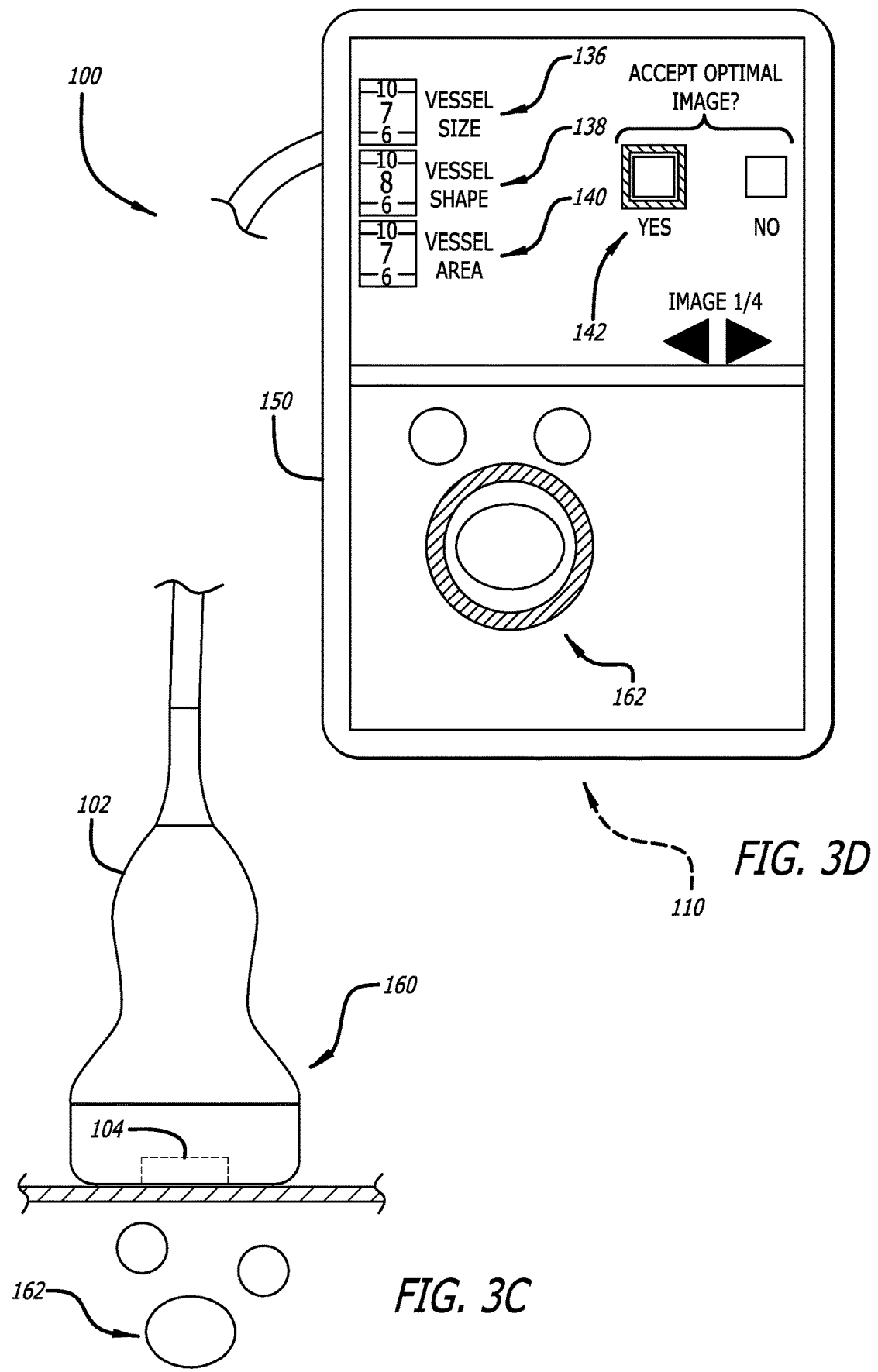
FIG. 3C illustrates a cross-sectional view of the exemplary method of detecting the target vessel, in accordance with some embodiments.
FIG. 3D illustrates a perspective view of an optimized ultrasound image shown of FIG. 3D shown on the display, in accordance with some embodiments.

FIG. 3C illustrates a cross-sectional view of an exemplary method of detecting the target vessel 162 using the ultrasound imaging system 100, in accordance with some embodiments. The ultrasound probe 102 may be brought into the target area 160 to capture a plurality of ultrasound images of the target vessel 162. In some embodiments, the console 110 may be configured to receive and analyze the plurality of ultrasound images for one or more optimal ultrasound images and display the one or more optimal ultrasound images on the display 150. As illustrated in FIG. 3C, in some embodiments, the target vessel 162 may demonstrate an average vessel shape, an average vessel size, and an average vessel area.

FIG. 3D illustrates a perspective view of an optimized ultrasound image of FIG. 3C shown on the display 150, in accordance with some embodiments. The console 110 may be configured to detect each of the vessels and other anatomical targets within the target area 160 within each of the plurality of ultrasound images. The console 110 may be configured to determine the target vessel 162 and evaluate the target vessel 162 for various characteristics to determine one or more optimal ultrasound images.

In some embodiments, each of the vessel size icon 136, the vessel shape icon 138, and the vessel area icon 140 may be configured to display each of the vessel characteristic maximum threshold value, the vessel characteristic minimum threshold value, and a detected vessel characteristic value to indicate to the user where the detected target vessel characteristic exists in relation to the vessel characteristic maximum threshold value and the vessel characteristic minimum threshold value. For example, in FIG. 3D, each of the detected target vessel size, target vessel shape, and target vessel area are average in the ultrasound image displayed on the display 150. The vessel size icon 136 indicates the target vessel size displayed as "7" is between the target vessel size maximum threshold of "10" and the target vessel size minimum threshold of "6". The vessel shape icon 138 indicates the target vessel shape displayed as "8" is between the vessel shape maximum threshold of "10" and the target vessel shape minimum threshold of "6". The vessel area icon 140 indicates the target vessel area displayed as "7" is between the target vessel area maximum threshold of "10" the target vessel area minimum threshold of "6".

Figures 3E, 3F:
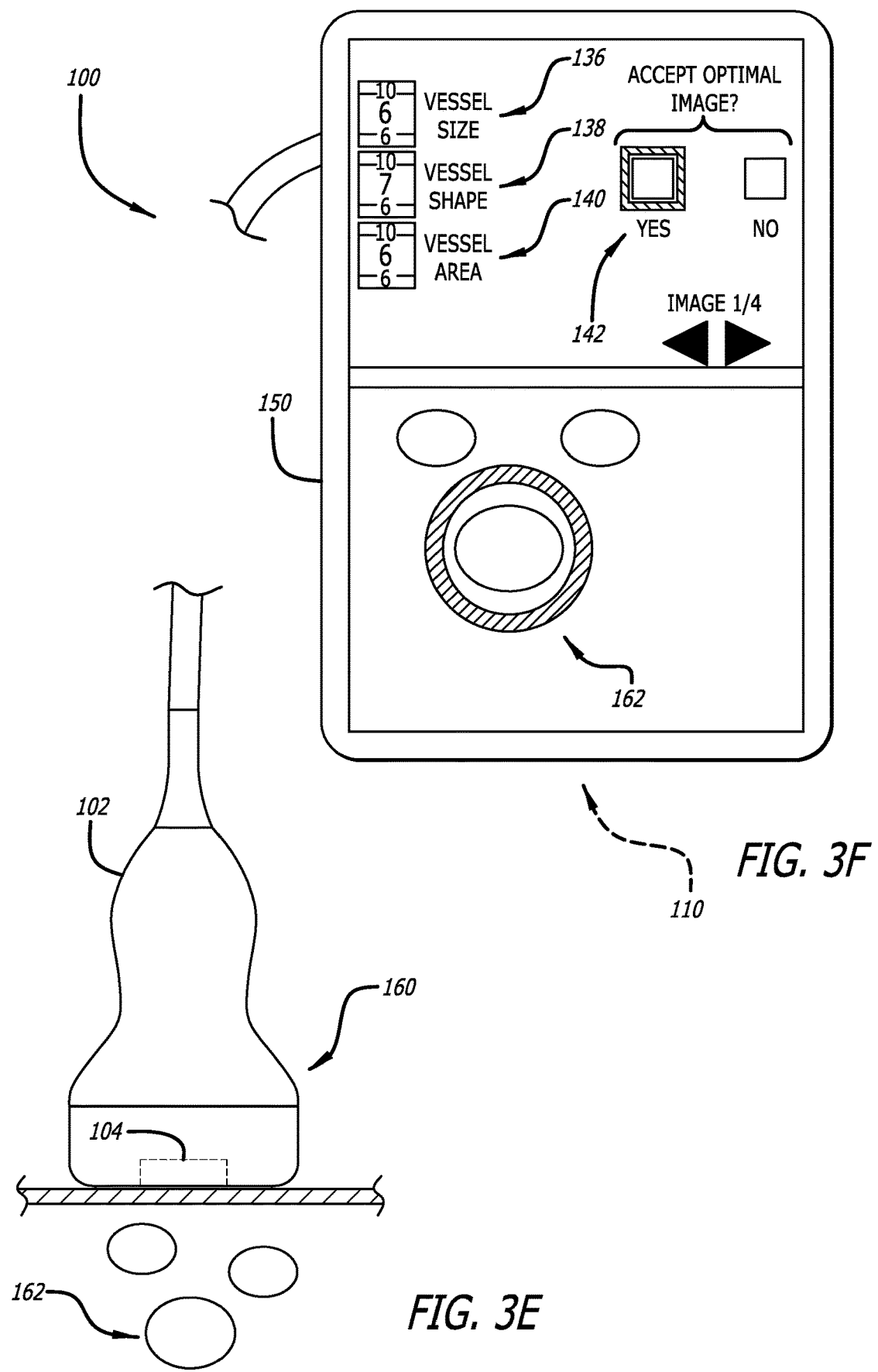
FIG. 3E illustrates a cross-sectional view of the exemplary method of detecting the target vessel, in accordance with some embodiments.
FIG. 3F illustrates a perspective view of an optimized ultrasound image of FIG. 3E shown on the display, in accordance with some embodiments.

FIG. 3E illustrates a cross-sectional view of an exemplary method of detecting the target vessel 162 using the ultrasound imaging system 100, in accordance with some embodiments. The ultrasound probe 102 may be brought into the target area 160 to capture a plurality of ultrasound images of the target vessel 162. In some embodiments, the console 110 may be configured to receive and analyze the plurality of ultrasound images for one or more optimal ultrasound images and display the one or more optimal ultrasound images on the display 150. As illustrated in FIG. 3E, in some embodiments, the target vessel 162 may demonstrate a vessel shape, a vessel size, and a vessel area.

FIG. 3F illustrates a perspective view of an optimized ultrasound image of FIG. 3E shown on the display 150, in accordance with some embodiments. The console 110 may be configured to detect each of the vessels and other anatomical targets within the target area 160 within each of the plurality of ultrasound images. The console 110 may be configured to determine the target vessel 162 and evaluate the target vessel 162 for various vessel characteristics to determine one or more optimal ultrasound images.

In some embodiments, each of the vessel size icon 136, the vessel shape icon 138, and the vessel area icon 140 may be configured to display each of the vessel characteristic maximum threshold value, the vessel characteristic minimum threshold value, and a detected vessel characteristic value to indicate to the user where the detected target vessel characteristic exists in relation to the vessel characteristic maximum threshold value and the vessel characteristic minimum threshold value. For example, in FIG. 3F, each of the detected target vessel size, target vessel shape, and target vessel area are below average but at or above each of the vessel size minimum threshold, the vessel shape minimum threshold, and the vessel area minimum threshold in the ultrasound image displayed on the display 150. The vessel size icon 136 indicates the target vessel size displayed as "6" is at the target vessel size minimum threshold of "6". The vessel shape icon 138 indicates the target vessel shape displayed as "7" is slightly above the vessel shape minimum threshold of "6". The vessel area icon 140 indicates the target vessel area displayed as "6" is at the target vessel area minimum threshold of "6".

In some embodiments, the console 110 may be configured to analyze each ultrasound image in the plurality of captured ultrasound images and present on the display 150 a defined number of optimal ultrasound images that meet a defined criteria. In some embodiments, the defined criteria may include ultrasound images having vessel characteristic values that exceed each of the vessel characteristic thresholds. For example, the console 110 may be configured to present on the display 150 all of the ultrasound images that have vessel characteristic values that meet the vessel characteristic maximum threshold or exceed the vessel characteristic average threshold, as illustrated in FIGS. 3A-3B. In some embodiments, the console 110 may be configured to present on the display 150 all of the ultrasound images that have vessel characteristic values that meet the vessel characteristic average threshold, as illustrated in FIGS. 3C-3D.

In some embodiments, the defined criteria may be multipronged, e.g., the defined criteria may be progressive. For example, the defined criteria may include images having all vessel characteristic values meeting all of the vessel characteristic maximum thresholds. In an instance where no ultrasound image of the plurality of captured ultrasound images includes all vessel characteristic values meeting all vessel characteristic maximum thresholds, the console 110 may be configured to present on the display 150 any ultrasound image of the plurality of captured ultrasound images that have some vessel characteristic values that meet some of the vessel characteristic maximum thresholds. In a similar fashion, in an instance where no ultrasound image of the plurality of captured ultrasound images includes some vessel characteristic values meeting some of the vessel characteristic maximum thresholds, the console 110 may be configured to present on the display any ultrasound image of the plurality of captured ultrasound images that have all vessel characteristic values that meet (i.e., comply with) all vessel characteristic average thresholds. In an instance further where no ultrasound image of the plurality of captured ultrasound images includes all vessel characteristic values meeting all vessel characteristic average thresholds, the console 110 may be configured to present on the display 150 any ultrasound image of the plurality of captured ultrasound images that includes vessel characteristic values that meet some of the vessel characteristic average thresholds, as illustrated in FIGS. 3E-3F. Progressively further, in an instance where no ultrasound image of the plurality of captured ultrasound images includes vessel characteristic values that meet some of the ultrasound vessel characteristic average thresholds, the console 110 may be configured to present on the display 150 any ultrasound image of the plurality of captured ultrasound images that have all vessel characteristic values that meet all of the vessel characteristic minimum thresholds. Still further, in an instance where no ultrasound image of the plurality of captured ultrasound images includes all vessel characteristic values meeting all of the vessel characteristic minimum thresholds, the console 110 may be configured to present on the display 150 any ultrasound image of the plurality of captured ultrasound images that includes some vessel characteristic values that meet some of the vessel characteristic minimum thresholds, or the console 110 may be configured to indicate to the user, that none of the plurality of captured images have any vessel characteristic values or enough vessel characteristic values that meet or exceed each of the vessel characteristic minimum thresholds.

Figure 4:
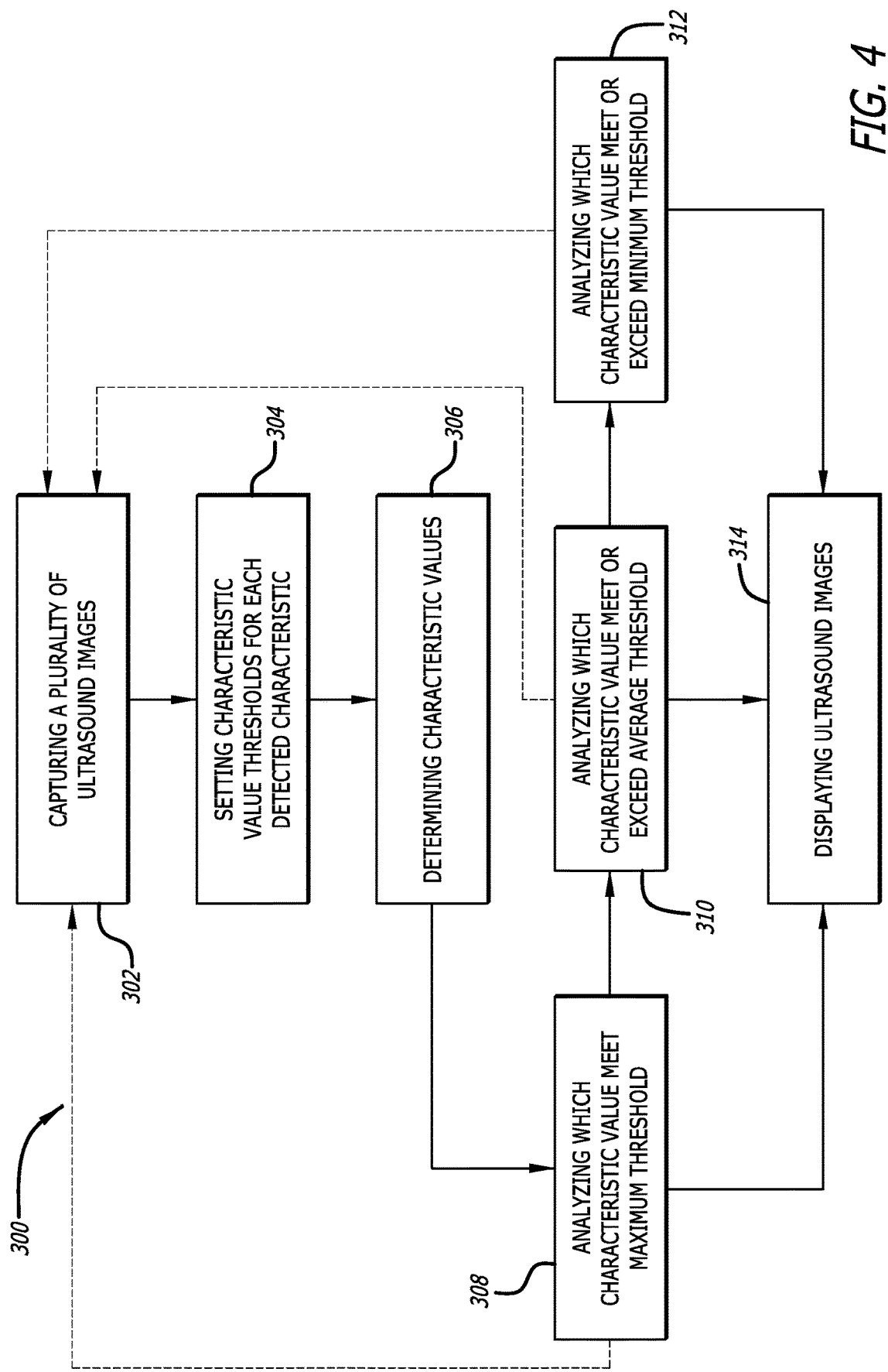
FIG. 4 illustrates a flow chart of an exemplary method of capturing a plurality of ultrasound images and selecting one or more optimized ultrasound images, in accordance with some embodiments.

FIG. 4 illustrates a flow chart of an exemplary method 300 of capturing a plurality of ultrasound images and selecting one or more optimal ultrasound images from the plurality of ultrasound images, in accordance with some embodiments. In some embodiments, the method 300 includes capturing a plurality of ultrasound images of a target vessel 162 (block 302). In some embodiments, capturing the plurality of ultrasound images of a target vessel 162 includes using an ultrasound imaging system 100 including an ultrasound probe 102 having an ultrasound array 104 in communication with a console 110 to capture a plurality of ultrasound images. In some embodiments, capturing the plurality of ultrasound images of a target vessel 162 includes an image capturing event triggering the ultrasound array 104 to capture the plurality of ultrasound images. In some embodiments, the image capturing event includes a user generated image capturing event or a console generated image capturing event. In some embodiments, the user generated image capturing event includes one or more ultrasound probe gestures, a touch screen activation of the display 150, a pressing of a button on the ultrasound probe 102, or a voice activation through the console 110. In some embodiments, the console generated image capturing event includes the console 110 detecting compression of the target vessel 162 or one or more vessel characteristic values meeting or exceeding vessel characteristic value thresholds.

In some embodiments, the method 300 further includes setting characteristic value thresholds for each desired vessel characteristic to be detected (block 304). In some embodiments, the console 110 may be in communication with a display 150. In some embodiments, setting characteristic value thresholds for each desired vessel characteristic to be detected includes deciding which vessel characteristics (e.g., vessel depth, vessel area, vessel size, vessel shape, or the like) are to be detected. In some embodiments, setting characteristic value thresholds for each desired vessel characteristic to be detected includes setting a maximum characteristic value threshold, an average characteristic value threshold, and a minimum characteristic value threshold for each desired characteristic to be detected. In some embodiments, setting a maximum characteristic value threshold, an average characteristic value threshold, and a minimum characteristic value threshold includes depicting each of the maximum characteristic value threshold, the average characteristic value threshold, and the minimum characteristic value threshold on the display 150.

In some embodiments, setting the maximum characteristic value thresholds, the average characteristic value thresholds, and the minimum characteristic value thresholds includes the console 110 automatically setting each of the maximum characteristic value thresholds, the average characteristic value thresholds, and the minimum characteristic value thresholds. In some embodiments, the console 110 automatically setting each of the maximum characteristic value thresholds, the average characteristic value thresholds, and the minimum characteristic value thresholds includes the console 110 automatically setting each of the characteristic value thresholds based on a desired target vessel purchase by length, a desired target vessel depth, or the like. In some embodiments, setting characteristic value thresholds for each desired characteristic value to be detected includes the console 110 automatically setting each of the maximum characteristic value thresholds, the average characteristic value thresholds, and the minimum characteristic value thresholds includes the console 110 using information provided by the user to automatically set each characteristic value threshold. For example, each of the characteristic value thresholds may be informed by dimensions of a vascular access device configured to be placed within the target vessel 162 including the size, the length, the shape, the make and the model of the vascular access device.

In some embodiments, the dimensions of the vascular access device may be communicated to the console 110 via an RFID tag, a barcode, a user input, or the like. In some embodiments, the console 110 using information provided by the user to automatically set each characteristic value threshold includes the user providing additional parameters to the console 110 to automatically set each characteristic threshold value. In some embodiments, the additional parameters may include a desired target vessel occupancy percentage, a desired target vessel occupancy diameter, or the like. In some embodiments, the console 110 automatically setting each of the maximum characteristic value threshold, the average characteristic value threshold, and the minimum characteristic value threshold includes the console 110 using historical data (e.g., previous optimal ultrasound images from previous patients) to set each of the maximum characteristic value thresholds, the average characteristic value thresholds, and the minimum characteristic value thresholds.

In some embodiments, the method 300 includes determining each of one or more vessel characteristic values (block 306). In some embodiments, determining each of the one or more vessel characteristic values includes the console 110 analyzing each ultrasound image of the plurality of ultrasound images and determining each of the vessel characteristic values. In some embodiments, determining each of the one or more vessel characteristic values includes the console 110 calculating each vessel characteristic value from each of the plurality of ultrasound images.

In some embodiments, the method 300 includes analyzing which of the detected vessel characteristic values meet each of the maximum characteristic value thresholds (block 308). In some embodiments, analyzing which of the characteristic values meet the maximum characteristic value thresholds includes comparing each of the detected characteristic values to each of the maximum characteristic value thresholds. If one or more ultrasound images include characteristic values meet each maximum characteristic value threshold, the method 300 includes displaying each of the one or more optimal ultrasound images on the display 150 as optimal ultrasound images (block 314). In some embodiments, when analysis of each ultrasound image occurs in real time, if one or more of the plurality of ultrasound images include vessel characteristic values that meet each maximum characteristic value threshold, the console 110 may be configured to activate the ultrasound probe 102 to capture additional ultrasound images (block 302).

However, in some embodiments, if no vessel characteristic values meet the maximum characteristic value threshold (block 308), the method 300 will further include analyzing which vessel characteristic values meet or exceed each average characteristic value threshold (block 310). In some embodiments, analyzing which of the vessel characteristic values meet or exceed the average characteristic value threshold includes comparing each of the detected characteristic values to each of the average characteristic value thresholds. If one or more ultrasound images include vessel characteristic values that meet or exceed each average characteristic value threshold, the method 300 may include displaying each of those ultrasound images on the display 150 as optimal ultrasound images (block 314). In some embodiments, when analysis of each ultrasound image occurs in real time, if one or more of the ultrasound images include vessel characteristic values that meet or exceed each average characteristic value threshold, the console 110 may be configured to activate the ultrasound probe 102 to capture additional ultrasound images (block 302).

However, in some embodiments, if no vessel characteristic values meet or exceed each average characteristic value threshold, the method 300 will further include analyzing which vessel characteristic values meet or exceed each minimum characteristic value threshold (block 312). In some embodiments, analyzing which of the vessel characteristic values meet or exceed the minimum characteristic value threshold includes comparing each of the detected vessel characteristic values to each of the minimum characteristic value thresholds. If one or more ultrasound images include vessel characteristic values that meet or exceed each minimum characteristic value threshold, the method 300 includes displaying each of those ultrasound images on the display 150 as optimal ultrasound images (block 314). In some embodiments, when analysis of each ultrasound image occurs in real time, if one or more of the ultrasound images include vessel characteristic values that meet or exceed each minimum characteristic value threshold, the console 110 may be configured to activate the ultrasound probe 102 to capture additional ultrasound images (block 302). If no ultrasound images have vessel characteristic values that meet or exceed the minimum characteristic value threshold, the console 110 may be configured to activate the ultrasound probe 102 to capture additional ultrasound images (block 302) and the display 150 may notify the user that no captured ultrasound images are optimal. Optimally, the user may adjust each characteristic value threshold and capture additional ultrasound images.

In some embodiments, the method 300 includes displaying each of the optimal ultrasound images on the display 150 (block 314). In some embodiments, the method 300 includes displaying each of the optimal ultrasound images on the display 150 having vessel characteristic values that meet or exceed each maximum characteristic value threshold. In some embodiments, displaying each of the optimal ultrasound images on the display 150 includes displaying each of the optimal ultrasound images on the display 150 having vessel characteristic values that meet or exceed each average characteristic value threshold. In some embodiments, displaying each of the optimal ultrasound images on the display 150 includes displaying each of the optimal ultrasound images on the display 150 having vessel characteristic values that meet or exceed each minimum characteristic value threshold.

In some embodiments, displaying each of the optimal ultrasound images on the display 150 includes additionally displaying a plurality of icons 134 on the display 150 including icons for each vessel characteristic value detected and each characteristic value threshold. In some embodiments, displaying each of the optimal ultrasound images on the display 150 includes displaying each of the optimal ultrasound images on the display 150 for confirmation, by the user, that each ultrasound image is an optimal ultrasound image and meets or exceeds each desired characteristic value threshold.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An ultrasound imaging system, comprising:
   an ultrasound probe having an ultrasound array configured to capture a plurality of ultrasound images of a target vessel and other anatomical targets within a target area; and
   a console in communication with the ultrasound array, the console configured to:
      detect one or more vessel characteristics of the target vessel,
      determine one or more vessel characteristic values from the one or more vessel characteristics, and
      compare each vessel characteristic value with one or more vessel characteristic thresholds to determine one or more optimal ultrasound images from the plurality of ultrasound images,
      wherein the one or more vessel characteristic thresholds include at least maximum vessel size threshold.

2. The system according to claim 1, wherein the one or more vessel characteristics include a target vessel shape, a target vessel size, a target vessel circularity, a target vessel depth, and a target vessel cross sectional area.

3. The system according to claim 1, wherein the one or more optimal ultrasound images include one or more ultrasound images having one or more vessel characteristic values that comply with the one or more vessel characteristic thresholds.

4. The system according to claim 1, wherein the one or more vessel characteristic thresholds include a maximum vessel characteristic threshold, an average vessel characteristic threshold, and a minimum vessel characteristic threshold.

5. The system according to claim 4, wherein the one or more optimal ultrasound images include one or more ultrasound images having one or more vessel characteristic values that comply with each maximum vessel characteristic threshold.

6. The system according to claim 4, wherein the one or more optimal ultrasound images include one or more ultrasound images having one or more vessel characteristic values that comply with each minimum vessel characteristic threshold.

7. The system according to claim 4, wherein the one or more optimal ultrasound images include one or more ultrasound images having one or more vessel characteristic values that comply with each average vessel characteristic threshold.

8. The system according to claim 4, wherein each of the one or more vessel characteristic thresholds are informed by dimensions of a vascular access device configured to be placed within the target vessel.

9. The system according to claim 8, wherein the dimensions of the vascular access device are communicated to the console by an RFID tag, a barcode, or user input.

10. The system according to claim 4, wherein each of the one or more vessel characteristic thresholds are informed by at least one of a desired percentage of target vessel occupancy or a desired target vessel occupancy diameter.

11. The system according to claim 4, wherein each of the one or more vessel characteristic thresholds are informed by at least one of a desired target vessel depth or a desired target vessel purchase.

12. The system according to claim 1, wherein the ultrasound imaging system includes a display in communication with the console, the display configured to depict the one or more optimal ultrasound images and one or more icons relating to the one or more vessel characteristic values.

13. The system according to claim 1, wherein the ultrasound probe includes a gyroscope in communication with the console, the gyroscope configured to detect movement of the ultrasound probe including one or more ultrasound probe gestures.

14. The system according to claim 13, wherein the ultrasound array is configured to capture the plurality of ultrasound images when the gyroscope detects the one or more ultrasound probe gestures.

15. The system according to claim 1, wherein the console includes one or more processors, an energy source, non-transitory computer readable medium, and a plurality of logic modules.

16. The system according to claim 15, wherein the plurality of logic modules, when activated by the one or more processors, are configured to perform operations including:
   capturing and receiving the plurality of ultrasound images;
   analyzing each ultrasound image to determine a vessel characteristic value for each vessel characteristic;
   determining one or more vessel characteristic thresholds;
   comparing each vessel characteristic value with each vessel characteristic threshold to determine the one or more optimal ultrasound images; and
   detecting ultrasound probe movement.

17. The system according to claim 1, wherein the ultrasound array is configured to capture the plurality of ultrasound images when each of the one or more vessel characteristic values comply with the one or more vessel characteristic thresholds.

18. The system according to claim 1, wherein the ultrasound array is configured to capture the plurality of ultrasound images when the console detects compression of the target vessel.

19. A method of capturing a plurality of ultrasound images and determining one or more optimal ultrasound images from the plurality of ultrasound images, comprising:
   capturing a plurality of ultrasound images of a target vessel;
   setting vessel characteristic value thresholds for each desired vessel characteristic to be detected;
   determining each of one or more vessel characteristic values of the target vessel;
   determining which of the one or more vessel characteristic values comply with each maximum characteristic value threshold;
   determining which of the one or more vessel characteristic values meet or exceed each average characteristic value threshold;
   determining which of the one or more vessel characteristic values meet or exceed each minimum characteristic value threshold; and
   displaying each of the one or more optimal ultrasound images on a display in communication with a console.

20. The method according to claim 19, wherein capturing the plurality of ultrasound images of the target vessel includes using an ultrasound probe having an ultrasound array in communication with the console to capture the plurality of ultrasound images.

21. The method according to claim 20, wherein capturing the plurality of ultrasound images of the target vessel includes an image capturing event triggering the ultrasound array to capture the plurality of ultrasound images.

22. The method according to claim 21, wherein the image capturing event includes a user generated image capturing event including one or more ultrasound probe gestures, a touch screen activation of the display, a pressing of a button on the ultrasound probe, or a voice activation.

23. The method according to claim 21, wherein the image capturing event includes a console generated image capturing event including detected compression of the target vessel or vessel characteristic values complying with vessel characteristic value thresholds.

24. The method according to claim 19, wherein setting vessel characteristic value thresholds for each desired vessel characteristic includes using dimensions of a vascular access device configured to be inserted into the target vessel to set vessel characteristic value thresholds for each desired vessel characteristic.

25. The method according to claim 19, wherein setting vessel characteristic value thresholds for each desired vessel characteristic includes using at least one of a desired percentage of target vessel occupancy or a desired target vessel occupancy diameter to set vessel characteristic value thresholds for each desired vessel characteristic.

26. The method according to claim 19, wherein displaying each of the one or more optimal ultrasound images on the display in communication with the console includes displaying each of the one or more optimal ultrasound images having vessel characteristic values that comply with each maximum characteristic value threshold.

27. The method according to claim 19, wherein displaying each of the one or more optimal ultrasound images on the display in communication with the console includes displaying each of the one or more optimal ultrasound images having vessel characteristic values that meet or exceed each minimum characteristic value threshold.

28. The method according to claim 19, wherein displaying each of the one or more optimal ultrasound images on the display in communication with the console includes displaying each of the one or more optimal ultrasound images having vessel characteristic values that meet or exceed each average characteristic value threshold.

* * * * *